(12) United States Patent
Ray

(10) Patent No.: US 9,991,908 B2
(45) Date of Patent: Jun. 5, 2018

(54) BLIND SOURCE SEPARATION OF SIGNALS HAVING LOW SIGNAL-TO-NOISE RATIO

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/271,512

(22) Filed: Sep. 21, 2016

(65) Prior Publication Data

US 2018/0083656 A1    Mar. 22, 2018

(51) Int. Cl.
| | | |
|---|---|---|
| H03K 9/00 | (2006.01) | |
| H04B 1/00 | (2006.01) | |
| H04B 1/16 | (2006.01) | |
| G06T 7/00 | (2017.01) | |

(52) U.S. Cl.
CPC ......... *H04B 1/0053* (2013.01); *H04B 1/1638* (2013.01); *G06T 7/0081* (2013.01)

(58) Field of Classification Search
CPC .................................................... H04B 1/0053
USPC ......................................................... 375/316
See application file for complete search history.

(56) References Cited

U.S. PATENT DOCUMENTS

| | | | |
|---|---|---|---|
| 6,876,321 B1 | 4/2005 | Slutzky et al. | |
| 7,184,493 B1 * | 2/2007 | Pringle ................... | G01S 7/021 |
| | | | 342/111 |
| 7,242,346 B1 | 7/2007 | Slutzky et al. | |
| 7,719,457 B1 * | 5/2010 | Tindall ...................... | G01S 7/38 |
| | | | 342/14 |
| 9,046,593 B2 | 6/2015 | Ray | |
| 9,467,317 B2 | 10/2016 | Ray et al. | |
| 2005/0086035 A1 * | 4/2005 | Peccoud ................. | G06F 19/18 |
| | | | 703/2 |
| 2016/0209492 A1 * | 7/2016 | Grandin .................. | G01S 7/021 |

OTHER PUBLICATIONS

Aishwarya et al., "Pulse digitizer generator for ESM systems", Int'l J. Engineering Trends and Technology, vol. 4, Issue 3, Sep. 2013, pp. 3809-3813.
Mahmoud et al., "Radar Parameter Generation to Identify the Target", Journal of Engineering, vol. 17, No. 1, Feb. 2011, pp. 173-185.

\* cited by examiner

*Primary Examiner* — Lihong Yu
(74) *Attorney, Agent, or Firm* — Ostrager Chong Flaherty & Broitman P.C.

(57) ABSTRACT

A blind source separation (BSS) system comprises means for gathering wideband signal power spectral information without using special Fourier transform hardware/software systems and without using extremely large signal memories. The method involves taking the combined energy output of a large set of BSS filters that are operating under a blind source separation algorithm that looks for signals of interest, along with instantaneous filter characteristics such as center frequency, bandwidth and spectral response, and records a weighted spread energy into a frequency- and time-based histogram. This information can then be used to compare against the BSS signal output and signal energy which does not correspond to existing signal output is added to additional BSS signal output. This system can operate in real time, but uses long-term averaging to enhance signal detection.

20 Claims, 10 Drawing Sheets

BLIND SOURCE SEPARATION OF SIGNALS HAVING LOW SIGNAL-TO-NOISE RATIO

BACKGROUND

The technology disclosed herein generally relates to methods and apparatus for detecting and classifying repetitive signals.

A receiver system is any system configured to receive energy waves and process these energy waves to identify desired information carried in the energy waves. As used herein, an "energy wave" is a disturbance that propagates through at least one medium while carrying energy. For examples, energy waves may comprise electromagnetic waves, radio waves, microwaves, sound waves or ultrasound waves.

Typically, a receiver system includes a transducer and a receiver. A transducer may be any device configured to convert one type of energy into another type of energy. The transducers used in a receiver system are typically configured to receive energy waves and convert these energy waves into an electrical signal. An antenna is one example of a transducer. A receiver processes the electrical signal generated by a transducer to obtain desired information from the electrical signal. The desired information includes information about signals carried in the energy waves.

Oftentimes, energy waves are used to carry repetitive signals. A repetitive signal is a signal that has a time period over which some aspect of the signal repeats. Repetitive signals are used in timing operations, synchronization operations, radar operations, sonar operations, and other suitable operations. For example, the characteristics of a repetitive signal may be used to synchronize two or more devices.

In some situations, a receiver system may receive energy waves carrying a repetitive signal but may be unable to identify desired information about the repetitive signal. For example, the receiver system may be unable to detect and/or classify the repetitive signal. Classifying a repetitive signal may include identifying one or more of the following exemplary parameters: frequency, pulse width, type of modulation, period, phase, and/or other suitable characteristics of the repetitive signal.

In at least some known signal processing systems, a plurality of mixed signals (e.g., radar signals) are received by a sensor communicatively coupled to a plurality of blind source separation (BSS) filters. Using signal processing techniques, the BSS filters are configured to separate and identify repetitive signals of interest from the plurality of mixed signals. To improve performance, at least some known BSS filters use pipellning and paralleling techniques.

Blind source separation typically requires measuring signal power out of filters centered at a given set of frequencies. The signals with the highest power can be selected by a BSS algorithm, subject to the hardware limitations of the number of filtered signals available. However, this approach cannot separate signals whose power density is near or below the background noise level (i.e., signals whose signal-to-noise ratio (SNR) is low), since those signals cannot be distinguished from noise on a sample-by-sample basis.

Existing solutions that use blind source separation of very low perceived power signals (hereinafter "low-SNR signals") typically involve either non-real-time analysis using recorded signals and human intervention or these signals are simply not separated from the data stream being received.

It would be desirable to provide systems and methods that enhance signal detection and separation of repetitive signals in a blind source separation system.

SUMMARY

The subject matter disclosed in detail below is directed to systems and methods that separate low-SNR signals using blind source separation methods. The systems disclosed herein reduce the SNR requirement by gathering wideband signal power spectral information without using special Fourier transform hardware/software/systems and without using extremely large signal memories. One method proposed herein is to take the combined energy output of a large set of BSS filters that are operating together to look for respective signals of interest. These BSS channels are matched to their respective signals of interest, i.e., their filter characteristics such as center frequency and bandwidth are matched to the center frequency and bandwidth of the corresponding signal of interest. These values are recorded in a two-dimensional (2-D) stochastic histogram with frequency along one axis and a consecutive stochastic diffogram along the other axis (hereinafter "2-D stochastic histogram"). This information can then be used to compare against pulse descriptor words (PDWs) generated from the separated signals to find lower SNR signals than can be found by the BSS subsystem alone. Thus the system proposed herein can use real-time information from a BSS subsystem together with long-term information from the 2-D stochastic histogram to enhance signal detection and separation in a BSS subsystem. In particular, the disclosed system allows sparse, dynamic and unstructured histogram-based information in a BSS subsystem to estimate power spectral and time-based parameters of low power signals that are only visible when processing over longer periods of time.

The system proposed herein is robust in the presence of noise and scaling and, more importantly, in the presence of sparse information due to the lack of current filter updates for particular time and frequency histogram values. To make this happen, the method in accordance with one embodiment uses a modification to the shape classification method called persistent barcodes, but using sparse techniques. Specifically, this method invokes the concept of tracking barcodes that cover sparse regions of interest. This allows the disclosed technique to drive any unused BSS filter hardware to fill in the unknown information.

One aspect of the subject matter disclosed in detail below is a method for performing blind source separation of signals, comprising: (a) separating signals as a function of frequency using at least some of a plurality of filters; (b) generating information vectors comprising respective data sets of parameter values of all separated signals regardless of their energy, wherein each data set of parameter values making up an information vector comprises time of arrival, frequency and energy; (c) adding the data sets of parameter values of the information vectors to a two-dimensional stochastic histogram; (d) identifying data sets of parameter values stored in the two-dimensional stochastic histogram corresponding to separated signals having energy less than a detection threshold; and (e) tuning an unused one of the plurality of filters to pass signals having a frequency characteristic of separated signals having energy less than the detection threshold. In accordance with some embodiments, this method further comprises: generating pulse descriptor words comprising respective data sets of parameter values of separated signals having energy greater than the detection threshold, wherein each data set of parameter values making up a pulse descriptor word comprises amplitude, time of arrival and frequency; and subtracting from the two-dimensional stochastic histogram those data sets of parameter values which are equivalent to the data sets of parameter values of the pulse descriptor words. In addition, this method further comprises generating pulse descriptor words comprising respective data sets of parameter values of signals passed through the tuned filter of the plurality of filters. Optionally, the method may further comprise identifying a source of the signals passed through the tuned filter based on pulse descriptor words comprising the respective data sets of parameter values of the signals passed through the tuned filter.

Another aspect of the subject matter disclosed in detail below is a system for processing received signals, comprising: a plurality of blind source separation channels, each blind source separation module comprising a respective filter and a respective blind source separation channel state machine associated with the respective filter; and a blind source separation control module communicatively coupled to the blind source separation channel state machines of the plurality of blind source separation channels. At least some of the plurality of blind source separation channels are configured to separate signals as a function of frequency and the blind source separation channel state machines are configured to generate information vectors comprising respective data sets of parameter values of all separated signals regardless of their energy, wherein each data set of parameter values making up an information vector comprises time of arrival, frequency and energy. The blind source separation control module is configured to add the data sets of parameter values of the information vectors to a two-dimensional stochastic histogram, identify data sets of parameter values stored in the two-dimensional stochastic histogram corresponding to separated signals having energy less than a detection threshold, and tune an unused one of the plurality of filters to pass signals having a frequency characteristic of separated signals having energy less than the detection threshold. In accordance with some embodiments, the system further comprises a pulse descriptor word generation module communicatively coupled to the plurality of blind source separation channels, wherein the pulse descriptor word generation module is configured to generate pulse descriptor words comprising respective data sets of parameter values of separated signals having energy greater than the detection threshold, wherein each data set of parameter values making up a pulse descriptor word comprises amplitude, time of arrival and frequency; and the blind source separation control module is further configured to subtract from the two-dimensional stochastic histogram those data sets of parameter values which are equivalent to the data sets of parameter values of the pulse descriptor words. The pulse descriptor word generation module is further configured to generate pulse descriptor words comprising respective data sets of parameter values of signals passed through the tuned filter of the plurality of filters. Optionally, the system further comprises a processor communicatively coupled to the pulse descriptor word generation module and configured to identify a source of the signals passed through the tuned filter based on pulse descriptor words comprising the respective data sets of parameter values of the signals passed through the tuned filter.

A further aspect of the disclosed subject matter is a method for performing blind source separation of signals, comprising: (a) separating signals as a function of frequency using at least some of a plurality of filters; (b) generating a first multiplicity of data sets of parameter values of all separated signals, wherein each data set of parameter values of the first multiplicity comprises time of arrival, frequency and energy; (c) adding the first multiplicity of data sets of parameter values of the information vectors to a two-dimensional stochastic histogram; (d) generating a second multiplicity of data sets of parameter values of all separated signals having energy greater than a detection threshold, wherein each data set of parameter values of the second multiplicity comprises time of arrival, frequency and energy; (e) subtracting from the two-dimensional frequency/time-of-arrival histogram those data sets of parameter values of the first multiplicity which are equivalent to the data sets of parameter values of the second multiplicity; identifying data sets of parameter values stored in the two-dimensional stochastic histogram corresponding to separated signals having energy less than the detection threshold; and (f) tuning an unused one of the plurality of filters to pass signals having a frequency characteristic of separated signals having energy less than the detection threshold. In accordance with some embodiments, the data sets of parameter values of the second multiplicity are pulse descriptor words.

Other aspects of systems and methods for blind source separation of low-SNR repetitive signals are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
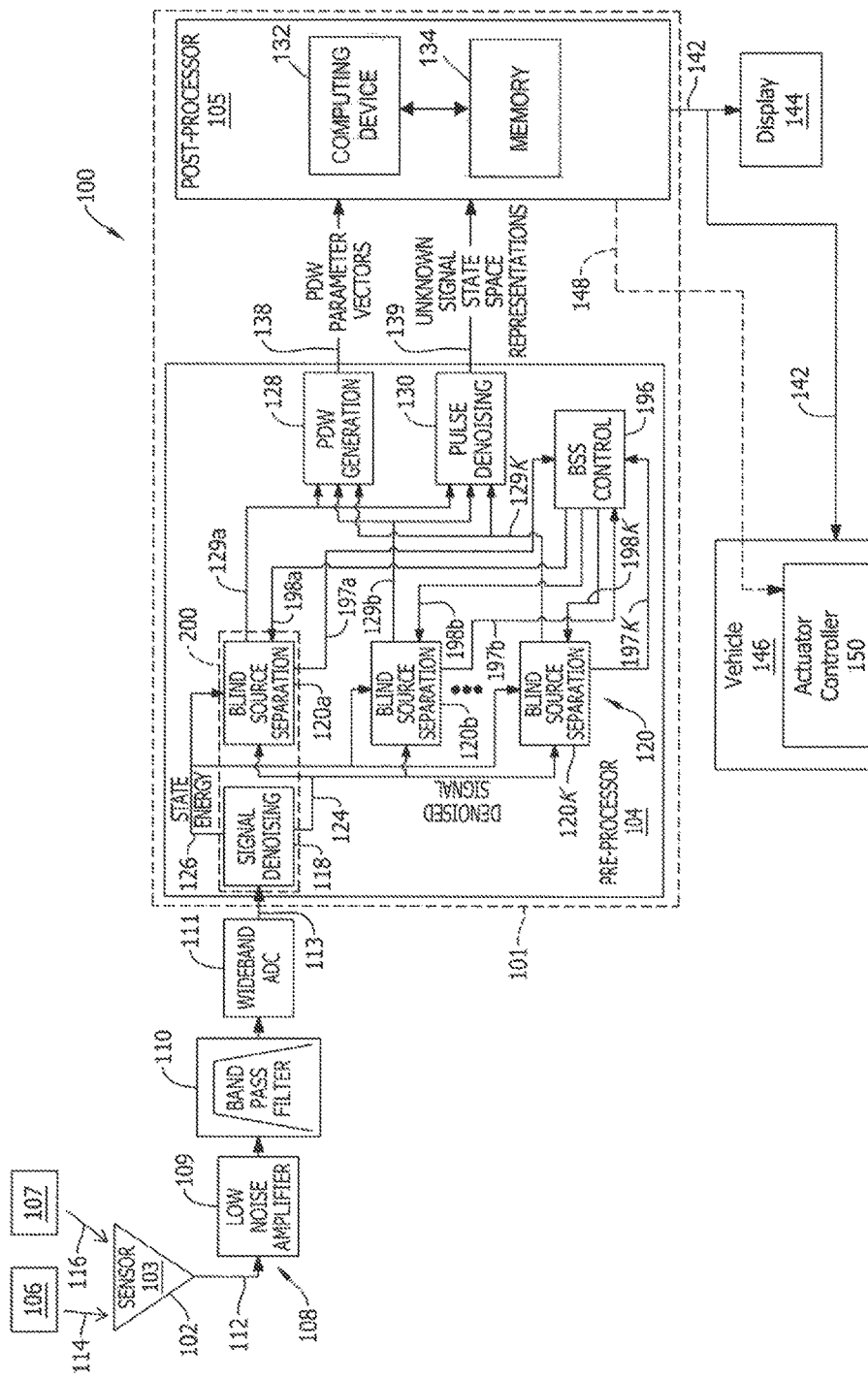
FIG. 1 is a block diagram showing a denoising and BSS architecture incorporated in a signal processing system for generating pulse descriptor words (PDWs) using blind source separation.

U.S. Pat. No. 9,046,593 (which is incorporated by reference herein in its entirety) discloses a detection and classification process that receives pulse information as input. Pulse information may be received continuously over time or periodically, depending on the implementation. Pulse information may include data identified for a plurality of parameters for each pulse identified by the receiver. As one illustrative example, pulse information may include a frequency, a pulse width, a phase, an angle of arrival, a time of arrival, at least one modulation parameter, a type of modulation, and/or other suitable information for each pulse identified by the receiver. Further, pulse information may also include one or more parameters for pairs or groups of pulses identified by the receiver. For example, pulse information may include a pulse repetition interval identified for each pair of pulses.

U.S. Pat. No. 9,046,593 further discloses a detection and classification process that processes pulse information using plurality of histogram processes. The receiver uses a plurality of histogram processes to generate a plurality of histograms for the plurality of parameters in the pulse information. In particular, the plurality of histogram processes generate stochastic histograms. In the illustrative examples given in U.S. Pat. No. 9,046,593, a stochastic histogram is generated for each parameter identified in the pulse information. The stochastic histogram generated may be selected from one of a regular stochastic histogram, a consecutive stochastic diffogram, or a circular stochastic histogram.

U.S. Pat. No. 9,046,593 also contains the following definitions of the terms "stochastic histogram" and "diffogram", which terms appear in the claims appended hereto.

A regular stochastic histogram uses the measured or assumed variance for a parameter to spread the histogram when each data point or value is added to the histogram. In other words, a stochastic histogram takes into account the uncertainty and/or variance of the data identified for the parameter.

For example, with a stochastic histogram, a data point may be added to the bin in which the data point falls and also added to the two bins on each side of the bin. In this manner, the data points are weighted individually such that the stochastic histogram approaches a more accurate probability density function (pdf) for the variable as compared to a regular histogram. By weighting each data point individually, the presence of noise in the data may be reduced.

With a stochastic histogram, the bin size may be set by the standard deviation of the data, and the probability density function may be assumed to be Gaussian. Of course, other types of probability density functions may be estimated using this type of stochastic histogram. If x is the data or value identified for the parameter with variance $\sigma^2$ and a bin consists of the following interval:

$$[b-\Delta b/2, b+\Delta b/2]$$

where b is the center of the bin, then the value of that bin for a Gaussian histogram becomes:

$$\frac{1}{\sigma\sqrt{2\pi}} \int_{b-\Delta b/2}^{b+\Delta b/2} \exp(-((t-x+b)/\sigma)^2)$$

where t is time.

A consecutive stochastic diffogram may have bins for data points identified for pairs or groups of consecutive pulses. For example, a consecutive stochastic diffogram may select pulse trains that have a substantially constant pulse repetition interval.

A pulse repetition interval is the time between pulses in the pulse train. Let $\{x_i\}$, i=1, ..., n, be the times of arrival (TOA) of pulses. The set of differences $\{x_i-x_j\}$, i>j, is then computed. This set may be constrained by the minimum and maximum limits for the potential pulse repetition intervals. The buildup of n total pulse slots with m missing pulses in the bin B with PRI∈B is at most n−m−1 and at least n−2m−1.

Each data point, $\delta=x_i-x_j$, is added to a bin B in a consecutive stochastic diffogram with each bin B containing:

$$\{y, [b-\Delta b, b+\Delta b], x_{old}\}$$

where y is the value for the bin, [b×Δb, b+Δb] is the interval for the bin, and $x_{old}$ is the previous value for the bin. Then, if $\delta \in B$ and $x_j = x_{old}$, y is incremented and $x_{old}$ is replaced by $x_j$. Each data point is a vector, and each bin is incremented based on matching the vector against another vector stored in the bin. In other words, the consecutive stochastic diffogram is a vector-valued histogram.

Adopting the foregoing definitions of the terms "stochastic histogram" and "consecutive stochastic diffogram", illustrative embodiments of BSS subsystems are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

By way of illustration of the utility and industrial applicability of the technology disclosed herein, wideband radar receivers will often see many radars operating at the same time, in addition to noise and other interfering signals. If the receiver computes Fourier transforms of its received signal over time, pulses at different frequencies will occur. If these pulses are counted in their frequency bins, what develops is a radar pulse histogram over frequency. Since radars are often agile in frequency, lumps or peaks will develop around the center frequency of each radar transmitter received. The signal classification task is then to separate out and classify al the radar signals received. This can more generally be applied to other parameters in addition to frequency. For pulsed signals, pulse width can be measured and can also be used to separate signals. Other parameters are modulation type and rate, pulse repetition rate, etc.

The signal classification system disclosed in detail below is robust in the presence of noise and scaling and, more importantly, in the presence of sparse information due to the lack of current filter updates for particular time and frequency histogram values. To make this happen, the method in accordance with one embodiment uses a modification to the persistent barcodes method, but using sparse techniques, together with a 2-D stochastic histogram consisting of a frequency histogram in one dimension and a consecutive stochastic diffogram in the other dimension. More specifically, the method uses the concept of tracking barcodes that cover sparse regions of interest. In this case the sparse tracking barcodes are applied to the 2-D stochastic stochastic histogram. This approach can be used both to dig out potential time and frequency locations that should have signals and to drive any unused BSS filter hardware to fill in the unknown information using this new information. Finally, through the continual updating of the 2-D stochastic histogram using newly tracked signals, further signals can be discovered in a virtuous feedback circle.

The system in accordance with one embodiment uses existing filter hardware of a BSS subsystem in a standard implementation. It does not require either large separate Fourier transform hardware or a large signal memory. Instead it requires only a smaller memory for processing stochastic histograms. The benefits include the ability to separate signals with a challenging set of sparse data. It allows the system to direct the filter hardware to fill in places where information is desired and use that information in an efficient way to separate signals using sparse tracking barcode techniques.

For the sake of illustration, an embodiment will now be described that separates incoming radar pulses and then generates pulse descriptor words (PDWs) for use in controlling a vehicle. However, it should be appreciated that the BSS subsystem disclosed herein may be used in applications other than vehicle control.

FIG. 1 is a block diagram identifying components of a signal processing system 100 for generating PDWs using blind source separation (BSS). Also known as blind signal separation, BSS subsystems and methods are employed for separation (i.e., filtering) of one or more source signals of interest from a plurality of mixed signals. In applications including, without limitation, an underdetermined case (i.e., fewer observed signals than signal sources), blind source separation facilitates filtering pure signals of interest from an arbitrary set of time-varying signals (e.g., radar pulses from one or more signal emitters) without relying on substantial amounts of known information about the source signals or the signal mixing process.

In an exemplary implementation, signal processing system 100 includes a signal data processor 101 communicatively coupled to an antenna 102 by way of a pre-conditioner 108. Antenna 102, in the exemplary implementation, is embodied as a wide-area sensor 103. Signal data processor 101 includes a pre-processor 104 and a post-processor 105. Sensor 103 is configured to surveil at least one radar signal emitter (two radar signal emitters 106 and 107 are indicated). In one implementation, pre-conditioner 108 includes at least one electronic component (e.g., a low-noise amplifier 109, a band pass filter 110, and a wideband analog-to-digital converter (ADC) 111) configured to pre-condition a sensor output signal 112. In operation, pro-conditioner 108 is configured to convert a sensor output signal 112 received from sensor 103 into a conditioned signal 113 transmitted to pre-processor 104. Each conditioned signal 113 is derived from a time-varying signal received at sensor 103. Time-varying signals may include a mix of signals received from radar signal emitters 106 and 107. For example, time-varying signals may include a first radar signal 114 generated by radar signal emitter 106 or a second radar signal 116 generated by radar signal emitter 107, which signals are received by sensor 103.

In the exemplary embodiment, pre-processor 104 includes one or more signal denoising modules 118, and a plurality of blind source separation (BSS) modules 120. Each BSS module 120 is coupled to a single signal denoising module 118, and represents one BSS channel 200. A total number of BSS channels 200 in signal processing system 100 is expressed as K. Signal denoising module 118 transmits a denoised signal 124 and a state energy signal 126 to each respective BSS module 120 (e.g., 120a, 120b, . . . , 120K) of the plurality of BSS modules 120. State energy signal 126 represents a quantity (e.g., an analog voltage level) that is proportional to the sum of the absolute value of an amplitude of incoming signal 113 squared at particular sampled time points (i.e., states).

In operation, incoming signal 113 is transmitted from pre-conditioner 108 to signal denoising module 118, where incoming signal 113 undergoes signal denoising and is subsequently transmitted as denoised signal 124 to each BSS module 120. For example, first radar signal 114 is initially received at sensor 103 as a pulse having signal characteristics including, without limitation, a frequency and a bandwidth. In this example, a single pulse of first radar signal 114, after processing by pre-conditioner 108, is then received at signal denoising module 118 as a mixed signal (i.e., the incoming signal 113 represents a signal pulse of the first radar signal 114 and has various characteristics including, without limitation, noise and information other than the desired information of interest). Signal denoising module 118 denoises the mixed incoming signal 113 prior to transmitting denoised signal 124 having a frequency and a bandwidth (or a regular pattern of frequencies and bandwidths) to the BSS modules 120. Methods implemented by signal processing system 100 are performed in substantially real time by the devices and systems described above, and as shown and described below in further detail with reference to FIG. 2.

Pre-processor 104 further includes a BSS control module 196 coupled to each BSS module 120. BSS control module 196 is configured to transmit a respective BSS control signal 198a through 198K to each of K BSS modules 120, as further shown and described below with reference to FIG. 2. The plurality of BSS modules 120 connected to the BSS control module 196 will be referred to herein as the "BSS subsystem".

Further, in an exemplary implementation, pre-processor 104 comprises a PDW generation module 128 and a pulse denoising module 130, both of which are coupled to receive blind source separated signals 129 from a plurality of BSS modules 120 of a BSS subsystem. PDW generation module 128 generates PDW parameter vector signals 138 based on respective blind source separated signals 129 (e.g., 129a, 129b, . . . , 129K) received from the BSS modules 120 (e.g., 120a, 120b, . . . , 120K). Each PDW parameter vector signal 138 contains data representative of characteristics of interest of one of radar signals 114 and 116 derived from a singular pulse of blind source separated signal 129 (e.g., frequency, bandwidth, time of arrival, time of departure, pulse width, pulse amplitude, pulse repetition interval, and/or angle of arrival (AOA)). Pulse denoising module 130 also generates an unknown signal state space representation signal 139 based on blind source separated signals 129. Unknown signal state space representation signal 139 contains data representative of additional (e.g., non-PDW-type) characteristics of interest of one of radar signals 114 and 116 from which usable spatial information about one of radar signal emitters 106 and 107 is discernable. PDW parameter vector signals 138 and unknown signal state space representation signals 139 are transmitted to post-processor 105.

Signal denoising module 118, PDW generation module 128, and pulse denoising module 130 include suitable signal filtering, signal amplification, signal modulation, signal separation, signal conditioning, and/or ADC circuitry implemented using analog and/or digital electronic circuit components. Also, in the exemplary embodiment, each BSS module 120 (e.g., 120a, 120b, . . . , 120K) transmits a respective blind source separated signal 129 (e.g., 129a, 129b, . . . , 129K) to PDW generation module 128 and to pulse denoising module 130. Each BSS module 120 (e.g., 120a, 120b, . . . , 120K) may be implemented in firmware on an FPGA or in pure hardware in an ASIC. Alternatively, each BSS module 120 (e.g., 120a, 120b, . . . , 120K) may be implemented as software running on a processor.

Further, in an exemplary implementation, post-processor 105 comprises a computing device 132 and a memory 134. The memory 134 comprises one or more non-transitory tangible computer-readable storage media. Post-processor 105 is communicatively coupled to pre-processor 104. In accordance with one embodiment, the computing device 132 is a processor running software.

In accordance with some embodiments, the PDW generation module 128 is configured to receive a respective blind source separated signal 129 from each BSS module 120. PDW generation module 128 is further configured to transmit a PDW parameter vector signal 138 to post-processor 105. PDW parameter vector signal 138 received by computing device 132 is stored as computer-readable data in memory 134 including, without limitation, as at least one buffered data set. In accordance with one implementation, the PDW generation module 128 will send each PDW to the computing system 132 as a PDW parameter vector signal 138 similar to (amplitude, time of arrival, center frequency, pulse width and bandwidth)=(amp, toa, cf, pw, bw). The PDW for each intercepted signal is stored in a pulse buffer for further processing by the computing system 132. As part of such processing, the PDWs are sorted and deinterleaved by clustering the incoming radar pulses into groups. In principle, each group should have characteristics representative of a single radar source or class of radar sources which allows that radar source or class to be identified. The identity of a particular signal is usually inferred by correlating the observed characteristics of that signal with characteristics stored in a list that also contains the identity of known radars.

In accordance with some embodiments, the pulse denoising module 130 is configured to receive blind source separated signals 129 from each BSS module 120. Pulse denoising module 130 is further configured to transmit an unknown signal state space representation signal 139 to post-processor 105. Unknown signal state space representation signal 139 received by computing device 132 is stored as computer-readable data in memory 134, including, without limitation, as at least one buffered data set. In an exemplary implementation, computing device 132 fetches buffered data sets from memory 134 for processing using a computer-based method employing an operating system running software executed from instruction set data also stored in memory 134.

The computing device 132 is configured to perform operations based on data contained in the PDW parameter vector signals 138 and unknown signal state space representation signals 139. Such operations include, without limitation, detecting, processing, quantifying, storing, and controlling a display device 144 for displaying (e.g., in human-readable data form) various characteristics of at least one of the radar signals 114 and 116 represented as data in the PDW parameter vector signals 138 and unknown signal state space representation signals 139. For example, a PDW parameter vector signal 138 generated by PDW generation module 128 may contain a plurality of PDW vector data blocks structured in a vector format, where each PDW vector data block contains one parameter of the first radar signal 114. Parameters representative of at least one characteristic of the first radar signal 114 contained in one PDW vector data block may include, without limitation, frequency, bandwidth, time of arrival, time of departure, pulse width, pulse amplitude, pulse repetition interval, and/or angle of arrival (AOA). The computing device 132 is configured to read at least a portion of PDW parameter vector signal 138 and carries out at least one of the aforementioned operations on at least one PDW vector data block. Also, in an exemplary implementation, the computing device 132 is configured to read and separate (i.e., deinterleave) PDW parameter vector signal 138 into its constituent PDW vector data blocks, and store fewer PDW vector data blocks including, without limitation, at least one predetermined type of information, in memory 134 than the total number of PDW vector data blocks contained in PDW parameter vector signal 138. In other implementations, the computing device 132 is configured to read and separate all PDW vector data blocks from one another and store all data contained therein in memory 134. The computing device 132 can also be configured to facilitate the aforementioned operations substantially simultaneously (i.e., in real time) with receipt of at least one of the plurality of radar signals 114 and 116 by the sensor 103.

Resultant data from operations performed by the computing device 132 are stored in memory 134. Further, in the exemplary implementation, computing device 132 causes post-processor 105 to transmit a human-readable data signal 142 to a human machine interface to facilitate at least one of an interaction, a modification, a visualization, at least one further operation, and a viewable recording of information about at least one radar signal 114 and 116 by a user of signal processing system 100. The human machine interface may be, for example, a display device 144 which receives the human-readable data signal 142 from post-processor 105. In one example, characteristics of radar signal emitters 106 and 107 determined by signal processing system 100 are displayed on display device 144 as a map having a grid representative of a physical spatial domain including a surveillable space of sensor 103, where locations and identifying information of radar signal emitters 106 and 107 are displayed and plotted substantially in real time. The human-readable data signal 142 may also be transmitted from post-processor 105 to at least one device and/or system (e.g., an aerial or ground-based vehicle 146) associated with signal processing system 100. Further, the computing device 132 enables post-processor 105 to transmit, in substantially real time, an actuator control signal 148 to an actuator controller 150 included within vehicle 146 to facilitate controlled movements thereof. For example, vehicle 146 may be a remotely and/or autonomously operated land vehicle or an unmanned aerial vehicle.

In operation, conditioned signal 113 is received by signal denoising module 118, where it undergoes signal denoising. The denoised signal 124 is transmitted to each BSS module 120. For example, first radar signal 114 may be transmitted to sensor 103 by first radar signal emitter 106 as a pulse having signal characteristics including, without limitation, a frequency (e.g., a center frequency) and a bandwidth. In this example, a single pulse of first radar signal 114 is received at signal denoising module 118 as a mixed signal (i.e., a signal pulse having various characteristics including, without limitation, noise and information other than the desired information of interest). Signal denoising module 118 denoises the mixed signal prior to transmitting a denoised signal 124 having a frequency and a bandwidth (or a regular pattern of frequencies and bandwidths). Methods implemented by signal processing system 100 are performed in substantially real time by the devices and systems described above, and as shown and described below in further detail with reference to FIG. 2.

In one mode of operation, at least one of frequency and bandwidth information contained in respective PDWs is plotted on a map on the display device 144 along with locations of respective radar signal emitters 106 and 107 to facilitate accurate tracking of locations and association with those particular radar signal emitters. In cases where at least one radar signal emitter is mobile, the map on display device 144 updates location information of at least one respective mobile radar signal emitter in substantially real time. Furthermore, the computing device 132 determines at least one of a velocity, an acceleration, a trajectory, and a track (i.e., including present and prior locations) of one or more mobile radar signal emitters (e.g., radar signal emitters 106 and 107). In another mode of operation, characteristics determined by signal data processing methods implemented by the signal data processor 101 may trigger a variety of substantially real-time physical actions in physical devices and systems in communication with the signal processing system 100. For example, characteristics of various radar signal emitters, including frequency and bandwidth determined by signal data processing methods implemented by signal processing system 100, may be transmitted in substantially real time as data to actuator controller 150 in vehicle 146 (e.g., rudders and flaps of a unmanned aerial vehicle) to facilitate maneuvers thereof, for example, to avoid an area of operation of an unauthorized radar signal emitter determined to be a threat or to move toward the unauthorized emitter to eliminate the threat. As a further example, characteristics of radar signal emitters 106 and 107 determined by signal data processing methods described herein may be transmitted in substantially real time in a control signal to at least one of an electronic support measure (ESM) device and an electronic warfare (EW) system associated with signal processing system 100 to direct, for example, a radar jamming signal at a particular radar signal emitter operating in the surveillable environment of sensor 103 without authorization.

As further shown and described below with reference to FIG. 2, each BSS module 120 in signal processing system 100 implements filtering methods with dynamic updating to generate high-quality PDWs containing at least one of amplitude, frequency, center frequency, bandwidth, pulse time of arrival, and pulse width information. Such improved accuracy and resolution of PDWs to track, for example, frequency and bandwidth of, for example, individual radar signals facilitates at least one of identifying, determining, and analyzing at least one radar signal emitter from which associated radar signals are emitted. For example, information including, without limitation, information derived from PDWs from at least one of the radar signal emitters 106 and 107 may be displayed on display device 144 after being transmitted thereto by post-processor 105 as human-readable data signal 142, as described above. This enhanced information enables signal processing system 100 to distinguish first radar signal emitter 106 from second radar signal emitter 107. Also, for example, different radar signal emitters in a surveilled environment of sensor 103 may be plotted at respective locations (i.e., grid coordinates) on display device 144 (i.e., as a map).

Also, in operation, each BSS module 120 separates a respective denoised signal 124. As further shown and described below with reference to FIGS. 2 and 3, each BSS module 120 contains a plurality of tunable filters, wherein each filter operates in accordance with filter parameters that include, without limitation, a center frequency and a bandwidth. Further, in the exemplary embodiment, pre-processor 104 includes a BSS control module 196, which facilitates controlling BSS modules 120. BSS control module 196 receives respective BSS data signals 197 (e.g., 197a, 197b, . . . , 197K) containing BSS-related information including, without limitation, frequency, bandwidth, and state, from each BSS module 120. Based on the BSS-related information contained in BSS data signals 197, BSS control module 196 also generates and transmits respective BSS control signals 198 (e.g., 198a, 198b, . . . , 198K) back to each respective BSS module 120 to control, for example and without limitation, a timing of receipt of denoised signal 124 and transmission of respective blind source separated signals 129 to at least one of PDW generation module 128 and pulse denoising module 130. Information contained in BSS data signals 197 and BSS control signals 198 is used by BSS control module 196 to facilitate implementation of a feedback control loop. The BSS control module 196 is further configured to tune (i.e., update) the center frequency and bandwidth of each filter of the plurality of filters in each BSS module 120 to enable radar signals which fall within the input bandwidth to be separated out in consistent BSS channels. BSS control module 196 also implements scheduling of fixed filter resources in each BSS module 120, which facilitates separation of denoised signals 124 with as few missed signals as possible given the filter resources available.

In accordance with one embodiment, BSS control module 196 comprises a processor running software. All of the other modules inside pre-processor 104 can be implemented in a processor running software or in firmware on a field-programmable gated array (FPGA) or in pure hardware in an application-specific integrated circuit (ASIC). And these could be mixed, some in hardware and some in software. However, the most reasonable implementation would be in hardware or in an FPGA for the other modules inside the pre-processor 104.

Figure 2:
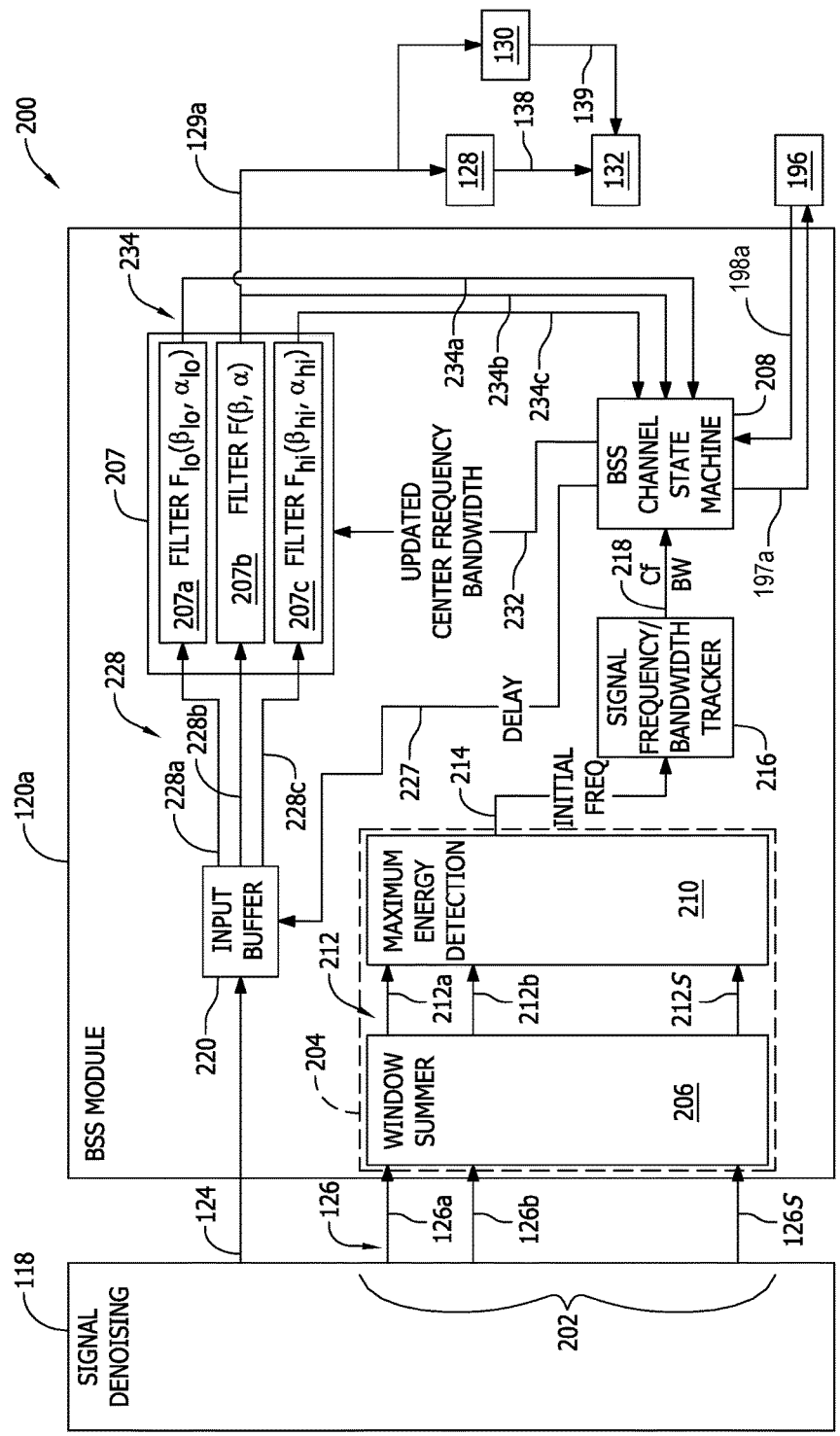
FIG. 2 is a block diagram identifying components of a blind source separation channel (hereinafter "BSS channel") that may be used in the signal processing system depicted in FIG. 1 to track both frequency and bandwidth.

FIG. 2 is a block diagram identifying components of an exemplary BSS channel 200 that may be used in the signal processing system 100 depicted in FIG. 1. In an exemplary implementation, signal denoising module 118 transmits a denoised signal 124 and a plurality of state energy signals 126. Also, in an exemplary implementation, the plurality of state energy signals 126 are representative of a state output 202 of the signal denoising module 118. Each state energy signal 126 of the plurality of state energy signals 126 contains information that is representative of the state (e.g., the analog voltage level that is proportional to the amplitude of incoming signal 113 at particular sampled time points) of a respective state output 202 of signal denoising module 118. The plurality of state energy signals 126 are received by a state energy analysis subsystem 204. State energy analysis subsystem 204 determines a center frequency (i.e., $f_0$) of respective state energy signals 126 of S signals (e.g., 126a, 126b, . . . , 126S) corresponding to S filter states of a filtering subsystem 207. State energy analysis subsystem 204 includes a window summer module 206 configured to determine a total energy within a set of S windows of length $N_e$ (i.e., one for each state of a BSS channel state machine module 208 of BSS module 120a). BSS channel state machine module 208 coordinates a timing of filtering of denoised signal 124 by filtering subsystem 207. State energy analysis subsystem 204 also includes a maximum energy detection module 210 coupled to window summer module 206. Maximum energy detection module 210 is configured to receive S summed window signals 212 (e.g., 212a, 212b, . . . , 212S) and determine a maximum energy of each summed window signal 212 of the S summed window signals 212. Maximum energy detection module 210 is further configured to determine and transmit a first or initial frequency signal 214 to a signal frequency and bandwidth tracker module 216 coupled to maximum energy detection module 210.

In an exemplary embodiment, initial frequency signal 214 is representative of the $f_0$ of the maximum energy of the respective state energy signal 126 corresponding to the associated state of BSS channel 200. Signal frequency and bandwidth tracker module 216 uses initial frequency signal 214 to determine a center frequency ("Cf") and a bandwidth ("BW") of the respective summed window signal 212 corresponding to the maximum energy state of BSS channel 200. Signal frequency and bandwidth tracker module 216 further outputs a Cf and BW signal 218 to BSS channel state machine module 208. BSS channel state machine module 208 is coupled to filtering subsystem 207, signal frequency and bandwidth tracker module 216, an input buffer module 220, and computing device 132. Substantially simultaneously with receipt of Cf and BW signal 218 by BSS channel state machine module 208 from signal frequency and bandwidth tracker module 216, input buffer module 220 delays filtering of denoised signal 124 by filtering subsystem 207 to enable BSS channel state machine 208 to update Cf and BW filter parameters of filtering subsystem 207 (as further described below).

Further, in an exemplary embodiment, filtering subsystem 207 is a tunable filter bank including a plurality of filter modules. In the illustrated embodiment, the filtering subsystem 207 includes a low filter ("$F_{lo}$") module 207a, a main filter ("F") module 207b, and a high filter ("$F_{hi}$") module 207c. In other implementations, filtering subsystem 207 may include more or less than three filter modules. Input buffer module 220 is coupled to and between filtering subsystem 207 and signal denoising module 118, and is configured to transmit a plurality of filter input signals 228 (e.g., 228a-c) to respective filter modules (e.g., 207a-c) in filtering subsystem 207. Input buffer module 220 is further configured to receive a delay signal 227 transmitted from a first output of the BSS channel state machine module 208. Delay signal 227 controls when the filter input signal 228 is sent from the input buffer 220 to the filtering subsystem 207. From a second output, BSS channel state machine module 208 transmits a center frequency and bandwidth update signal 232 to filtering subsystem 207. Center frequency and bandwidth update signal 232 enables continuous updating of Cf and BW operational parameters and associated filter coefficients α and β, respectively, of each filter module (e.g., 207a, 207b, and 207c) in filtering subsystem 207. Center frequency and bandwidth update signal 232 thus facilitates accurate tracking of denoised signal 124 frequency and bandwidth to yield a continuous and undistorted blind source separated signal 129a output from BSS module 120a.

Furthermore, in an exemplary implementation, filtering subsystem 207 is embodied as digital or analog electronic circuitry including, without limitation, circuits instantiated in at least one of a field-programmable gate array and an application-specific integrated circuit. Further, in an exemplary implementation, operational parameters of each filter module of the plurality of filter modules 207a-c in filtering subsystem 207 are stored in memory 134 (see FIG. 1), where they are updated substantially simultaneously (i.e., in real time) with transmission of center frequency and bandwidth update signals 232 by the BSS channel state machine module 208. Filter modules 207a-c have both a pipelined architecture (as described below in association with FIG. 3) and a parallelized architecture in the exemplary embodiment.

In the exemplary embodiment, filter modules 207a-c receive respective filter input signals 228a-c from input buffer module 220, and are each further coupled to BSS channel state machine module 208. Filtering subsystem 207 is further configured to transmit a plurality of signal energy signals 234, where filter modules 207a-c each transmit respective signal energy signals 234a-c respectively to BSS channel state machine module 208. Further, in the exemplary embodiment, filter module 207b also transmits signal energy signal 234b as the respective blind source separated signal 129a transmitted from BSS module 120a to PDW generation module 128 and to pulse denoising module 130 for further processing (e.g., deinterleaving of PDW parameter vector signal 138 by computing device 132, as shown and described above with reference to FIG. 1). Information contained in the plurality of signal energy signals 234 is used by BSS channel state machine module 208 for generating and transmitting center frequency and bandwidth update signal 232 to filtering subsystem 207 (as further shown and described below with reference to FIG. 3).

In operation, feedback in BSS channel 200 is used to determine where (e.g., at what value or values) to place the Cf and BW of each filter module (e.g., filter modules 207a-c) of filtering subsystem 207 over all time. The feedback includes acquiring energy measurements resulting from existing filter settings (e.g., from signal energy signals 234a-c), and continuously and adaptively updating respective filter parameters Cf and BW and filter coefficients α and β, while maintaining as complete a coverage in time and frequency as possible. Subsequent pulses of radar signals are filtered by filtering subsystem 207 with filter modules 207a-c having respective filter parameters and coefficients tuned to enable filtering subsystem 207 to multitask in a very efficient manner (e.g., under control, at least in part, of BSS control module 196, as described above with reference to FIG. 1).

Also, in operation, signal frequency and bandwidth tracker module 216 includes a tracking algorithm to track a value of the initial frequency signal 214. Specifically, the center frequency of the initial frequency signal 214 changes at any rate up to a maximum predetermined rate set by the tracking algorithm (e.g., determined by at least one of computing device 132, BSS channel state machine module 208, and BSS control module 196). A track window of the tracking algorithm is short enough to support a chirp rate, but long enough to handle the signal noise level. In particular, the tracking algorithm is robustly implemented by BSS channel 200 including, without limitation, in conjunction with computing device 132, as a function of all of the following: parameter and/or coefficient settings of the plurality of filter modules (e.g., 207a-c), noise levels, signal frequency change characteristics, amplitude differences, and ability to pull-in signals within range required by signal denoising module 118. For example, and without limitation, where signal denoising module 118 has twenty states (i.e., S=20) with a 1 GHz bandwidth, BSS channel 200 tracks radar signals with a frequency offset from an initial frequency (i.e., pull-in range) up to ±25 MHz (i.e., 0.025 GHz).

Further, in operation, each of the filter modules 207a-c in filtering subsystem 207 is embodied as at least one of a finite impulse response (FIR) filter and an infinite impulse response (IIR) filter. In an exemplary implementation, use of IIR-type filters in filtering subsystem 207 enables lower-cost filter devices having greater precision than FIR-type filters. Also, in an exemplary implementation, each BSS channel 200 processes radar signals rather than communications signals and, therefore, the effects of a non-constant group delay caused by using IIR filters is less important than with communications signals and IIR filters adequately meet the signal quality required for post-filtering PDW deinterleaving by post-processor 105.

Furthermore, in operation, main filter module 207b is used as the "correct" tracking filter for the filter input signal 228 being separated. Low filter module 207a and high filter module 207c are used in the tracking process to keep main filter module 207b on target in both frequency and bandwidth. Also, in an exemplary implementation, low filter module 207a and high filter module 207c are offset by fixed amounts in frequency and bandwidth and, as with main filter module 207b, are continuously monitored to facilitate appropriate and timely tuning of the center frequency and bandwidth of each filter module. In an alternative implementation, not shown, filtering subsystem 207 includes two (F and $F_{hi}$), rather than three, filter modules and a simplified tracking process tracks only frequency. In this alternative implementation, each BSS channel 200 has a fixed bandwidth.

In operation, each of the filter modules 207a-c in filtering subsystem 207 is parameterized by two values (i.e., center frequency and bandwidth) which are stored in memory 134. The center frequency and bandwidth values are updated by the BSS control module 196, including, without limitation, in conjunction with computing device 132, in as few as two hardware clock cycles. In the simplified tracking process wherein filtering subsystem 207 includes only a main filter module 207b ("F") and a high filter module 207c ('$F_{hi}$'), the center frequency of filter F is referred to as f and the bandwidth of filter F is referred to as w, so that:

$$\text{center frequency}(F_{hi}) = f + \Delta f \tag{1}$$

$$\text{bandwidth}(F_{hi}) = w \tag{2}$$

For the exemplary implementation, where filtering subsystem 207 includes three filter modules 207a-c, the center frequency and bandwidth of filter F are defined according to Eqs. (1) and (2), and the center frequency and bandwidth of filters $F_{lo}$ and $F_{hi}$ are defined as follows:

$$\text{center frequency}(F_{hi}) = f - \Delta f \tag{3}$$

$$\text{bandwidth}(F_{hi}) = w - \Delta w \tag{4}$$

$$\text{center frequency}(F_{hi}) = f + 2\Delta f \tag{5}$$

$$\text{bandwidth}(F_{hi}) = w + 2\Delta w \tag{6}$$

Also, in operation, filter input signal 228 is input to filtering subsystem 207 and main filter module 207b outputs blind source separated signal 129 to PDW generation module 128, as shown and described above with reference to FIG. 1. Separately, each of signal energy signals 234 output by filter modules 207a-c of filtering subsystem 207 has its output energy determined by at least one of filtering subsystem 207, BSS channel state machine module 208, and computing device 132, for example, by squaring and taking the absolute value (i.e., if using complex signals instead of real signals). This results in a sequence of energy measurement pairs or triples (E(n), $E_{lo}(n)$, $E_{hi}(n)$), where n=1, 2, etc. The determination of output energy of signal energy signals 234 facilitates the following updates to the center frequency (i.e., f) parameters of filter F and filter $F_{hi}$ in the simplified alternative implementation:

$$f \leftarrow f + \alpha_0 * [(E(n) - E_{hi}(n))/(E(n) + E_{hi}(n))] + \alpha_1 \tag{7}$$

For the exemplary implementation, where filtering subsystem 207 includes three filters F, $F_{hi}$, and $F_{lo}$, the f and w parameters are updated as follows:

$$f \leftarrow f + \alpha_0 * [(E(n) - E_{lo}(n))/(E(n) + E_{lo}(n))] + \alpha_1 * [(E(n) - E_{hi}(n))/(E(n) + E_{hi}(n))] + \alpha_2 \tag{8}$$

$$w \leftarrow w + \beta_0 * [E(n) - E_{lo}(n)]/[E(n) + E_{lo}(n)] + \beta_1 * [(E(n) - E_{hi}(n))/(E(n) + E_{hi}(n))] + \beta_2 \tag{9}$$

where initial values of coefficient vectors $\alpha$ and $\beta$ are determined and stored in memory 134 during a pre-training process (e.g., implemented by at least one of computing device 132, BSS channel state machine module 208 and BSS control module 196), and are functions of window size, BW and signal-to-noise ratio (SNR). Initial values of $\alpha$ and $\beta$ are determined from at least one of an initial denoised signal 124 and an initial state energy signal 126 received by BSS channels 200.

Referring again to FIG. 2, in operation of the exemplary embodiment, respective filter input signals (e.g., 228a, 228b, and 228c) derived from the denoised signal 124 are provided substantially simultaneously to each filter module 207a-c in filtering subsystem 207 of each BSS module 120. In BSS module 120a, for example, the resulting blind source separated signal 129a output by filtering subsystem 207 is further vectorized into PDW parameter vector signal 138 by PDW generation module 128 to further facilitate accurate tracking and determination of frequency and/or bandwidth of at least one radar signal. Therefore, each BSS channel 200 enables signal processing system 100 to implement high-performance real-time tracking of a plurality of time-varying radar signals streaming through pre-processor 104.

The aforementioned filtering methods enable signal processing system 100 to generate high-quality PDW parameter vector signals 138 that are used for identifying, determining, and analyzing radar signal emitters 106 and 107. For example, PDW parameter vector signals 138 associated with radar signal emitter 106 are displayed on display 144, as described above. Also, for example, improved information about frequencies and/or bandwidths contained in at least two PDW parameter vector signals 138 enable signal processing system 100 to distinguish first radar signal emitter 106 from second radar signal emitter 107. These radar signal emitters 106 and 107 are plotted at respective locations on display 144 (e.g., as a map).

Figure 3:
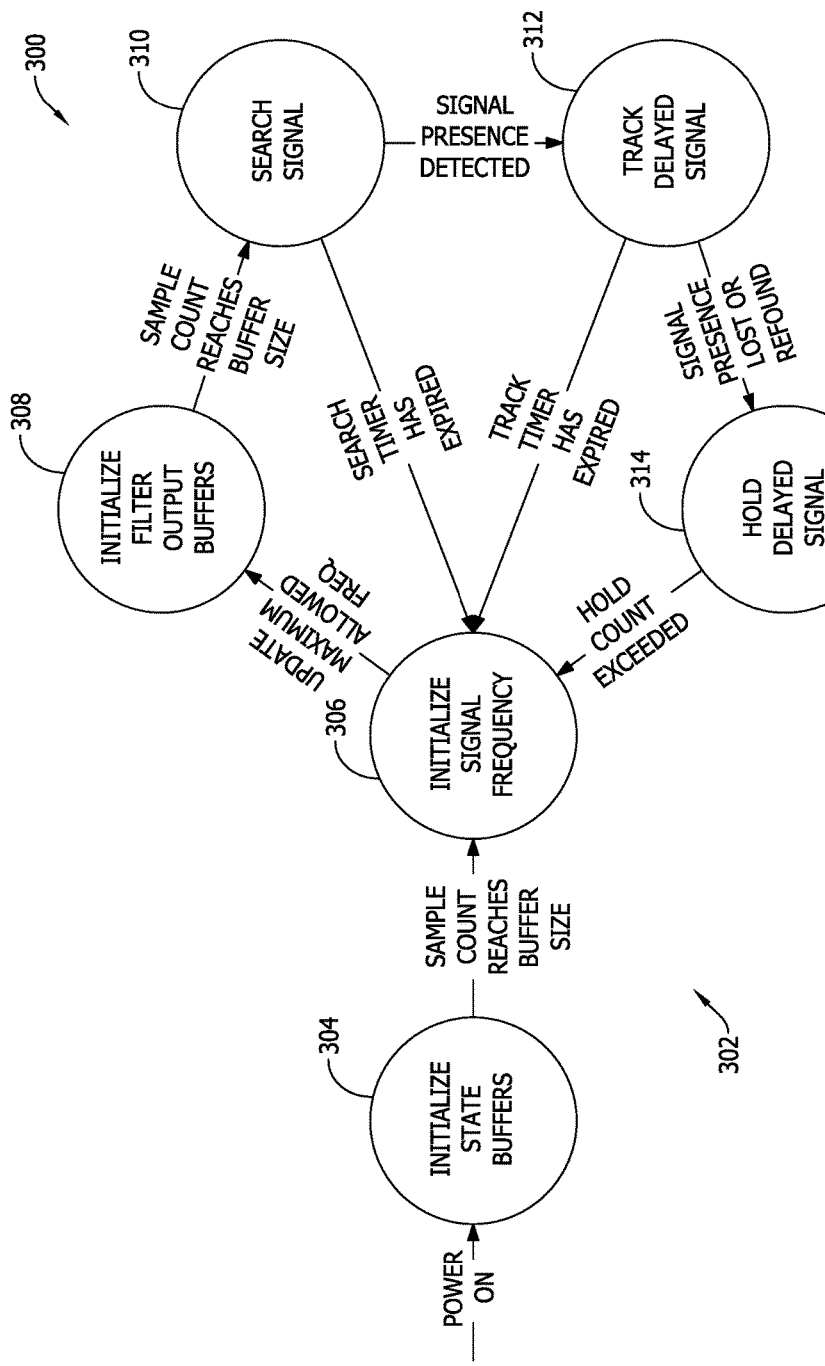
FIG. 3 is a flowchart identifying steps of a data processing method performed by a blind source separation channel state machine (hereinafter "BSS channel state machine") that may be used with the BSS channel depicted in FIG. 2.

FIG. 3 is a schematic diagram of an exemplary BSS channel state machine 300 that may be used with BSS channel 200 shown in FIG. 2. In an exemplary implementation, the BSS channel state machine 300 includes a plurality of states 302. The plurality of states 302 of BSS channel state machine 300 include a first state 304, a second state 306, a third state 308, a fourth state 310, a fifth state 312, and a sixth state 314. Also, in an exemplary embodiment, the BSS channel state machine 300 (including, without limitation, in conjunction with computing device 132) changes state as follows: first state 304→second state 306→third state 308→fourth state 310→fifth state 312→sixth state 314→second state 306, as shown in FIG. 3. First state 304 includes initialization of state energy buffers, and it begins when a user powers on the signal processing system 100. In order to compare energies of different states, a continuous sum is determined over a time window of length $N_e$. Thus, the first state 304 enables the initial sum to complete from power-up and is never reentered.

Also, in an exemplary implementation, the second state 306 includes initialization of the signal frequency. Once each state's summed energy is computed, a maximum value thereof is determined in S clocks and an initial tracking frequency $f_0$ is determined using a linear relationship between the states and their corresponding frequencies. The second state 306 also includes initiation of the tracking frequency that is input to the tunable tracking filters of filtering subsystem 207 (see FIG. 2), offset appropriately.

Further, in an exemplary implementation, the third state 308 includes initialization of the filter output buffers. In order to compare filter output energies from all the tracking filters of filtering subsystem 207 over a time window of length $N_f$ with the initial frequency setting, the third state 308 waits $N_f$ sample times so that the summed energies accurately reflect the effects of the frequency that is set.

Further, in an exemplary implementation, the fourth state 310 includes searching the delayed signal. After accurate filter output energies are acquired, the frequency and bandwidth updates can be computed correctly. Thus, the fourth state 310 also includes initiating the tracking loop. To do so, the fourth state 310 further includes switching to a delayed sample from the sample buffer of length $N_s$ and attempts to pull-in the signal until a signal presence indicator is equal or greater than a predetermined threshold. If the signal presence indicator does not equal or exceed the predetermined threshold, the fourth state 310 transitions back to the second state 306 after a search counter expires.

Furthermore, in an exemplary implementation, the fifth state 312 includes tracking the delayed signal. After the signal is detected, it is continually tracked from the delay sample buffer as long as the signal is present, or until a track timeout occurs. The track timeout is used by the BSS control system including, without limitation, at least one of the BSS control module 196 and the computing device 132, to keep the tracking filter resources of filtering subsystem 207 from being kept busy by long communications signals (i.e., which would prevent those filtering resources from being utilized for more important radar signals). A track timeout event during the fifth state 312 causes a transition back to the second state 306. However, if the signal presence indicator is equal to or less than the predetermined threshold, the fifth state 312 transitions to the sixth state 314.

Moreover, in an exemplary implementation, the sixth state 314 includes holding the delayed signal. When the tracked signal is no longer present (i.e., no longer detected by sensor 103), the hold state of the sixth state 314 prevents updating of the frequency and starts a hold timer. If the signal presence indicator equals or is greater than the predetermined threshold, the sixth state 314 transitions back to tracking the delayed signal (i.e., fifth state 312). Otherwise, the hold timer will expire and the sixth state 314 transitions back to the second state 306.

The technological improvement that is the subject of this disclosure operates within the context of a denoising and BSS architecture as shown in FIG. 1. In particular, the method proposed herein is part of the BSS control module 196 that takes input from each BSS channel 200 and is able to inform the BSS subsystem about new frequencies and bandwidths that potentially contain signals of interest in order to more effectively use the limited BSS channel resources to find as many signals as possible, including those with low SNR that would ordinarily not trip a detection threshold.

Each BSS channel 200 tracks in frequency alone or in both frequency and bandwidth as shown in FIG. 2. In particular the BSS control information that is updated by the state machine is a vector with the following information:

(time; frequency; bandwidth; energy)

at each point in time that the state machine updates these values for its tracking filters. This information provides the input to the method disclosed in detail below.

BSS subsystem must have an overall control of all the channels that uses a periodic time-frequency covering map to decide where to place the center frequency and bandwidth of each filter over all time by taking in energy measurements from existing filter settings and adaptively updating continuously while maintaining a coverage in time and frequency that is as complete as possible. The output of the BSS channel state machine 208 includes an updated center frequency and bandwidth to initialize and control the filters 207 during search, track and hold states. The BSS control information represents passing the frequency, bandwidth, signal energy (and their implied time stamp) to the method described below in information vectors as given above.

A histogram can provide a graphical representation of the distribution of data. A histogram is an estimate of the probability distribution of a continuous variable (quantitative variable) or continuous signal. To construct a histogram, the system can "bin" the range of values—that is, divide the entire range of values into a series of small intervals—and then count how many values fall into each interval or bin. Rectangular intervals can be formed with height proportional to the count and width equal to the bin size, so that adjacent rectangles can abut each other. A histogram may also be normalized to display relative frequencies. It then shows the proportion of cases that fall into each of several categories, with the sum of the heights equaling unity. The bins can be specified as consecutive, non-overlapping intervals of a variable or signal. The bins (intervals) can be adjacent and equal in size. The rectangles of a histogram are drawn so that they touch each other to indicate that the original variable is continuous.

Histograms can provide a rough sense of the density of the data. Also, for density estimation, histograms can be useful for estimating the probability density function of the underlying variable or signal. A histogram can be thought of as a simplistic kernel density estimation, which uses a kernel to smooth frequencies over the bins. This yields a smoother probability density function, which will in general more accurately reflect distribution of the underlying variable.

When using a standard classification algorithm, after a histogram function has been constructed from a variable or a signal, the "peaks" are found. The peaks are referred to herein as "events" and the event finding method can be accomplished using various algorithms (two exemplary algorithms are described in detail below).

In accordance with some embodiments, a special histogram technique is used that allows a BSS subsystem to find low-SNR signals by efficiently using the limited BSS channel filter hardware available to the system. This approach has several important features: (1) it gives the ability to blindly separate low power signals via histograms; (2) it is robust in the presence of noise and scaling; and (3) it works effectively in the presence of sparse information due to the lack of current filter updates for particular time and frequency histogram values.

The method in accordance with one embodiment comprises at least the following innovations: (1) creation of a 2-D stochastic histogram with frequency on one axis and time of arrival on the other axis; and (2) creation of a sparse barcode technique to find events within this histogram, producing updates to frequency and time to drive any unused BSS channel hardware.

Figure 4:
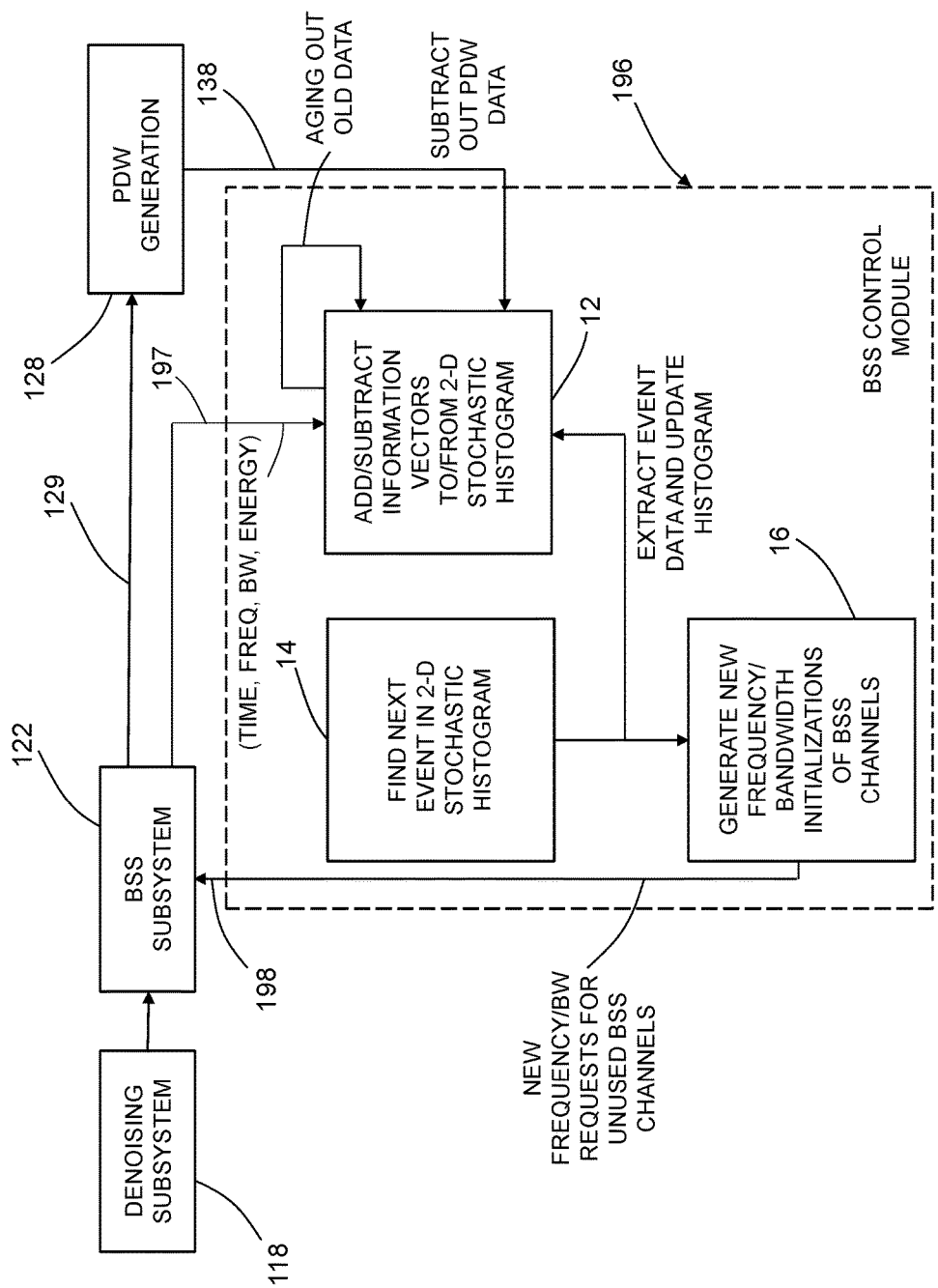
FIG. 4 is a diagram showing control of a BSS subsystem for processing low-SNR signals.

FIG. 4 is a diagram showing control of a BSS subsystem 122 for processing low-SNR signals. A PDW generation module 128 receives blind source separated signals 129 from the filtering subsystem 207 (not shown in FIG. 4) of each BSS module 120 of the BSS subsystem 122. Within each BSS module 120, the BSS channel state machine module 208 (not shown in FIG. 4) receives the same blind source separated signals 129 and outputs respective BSS data signals 197 containing BSS-related information vectors based thereon. More specifically, every state machine update from each active BSS channel produces the information vector (time, frequency, bandwidth, energy)=(t, f, b, e) to be added (step 12 in FIG. 4) to a 2-D stochastic histogram that is continually updated by the BSS control module 196.

Figure 5:
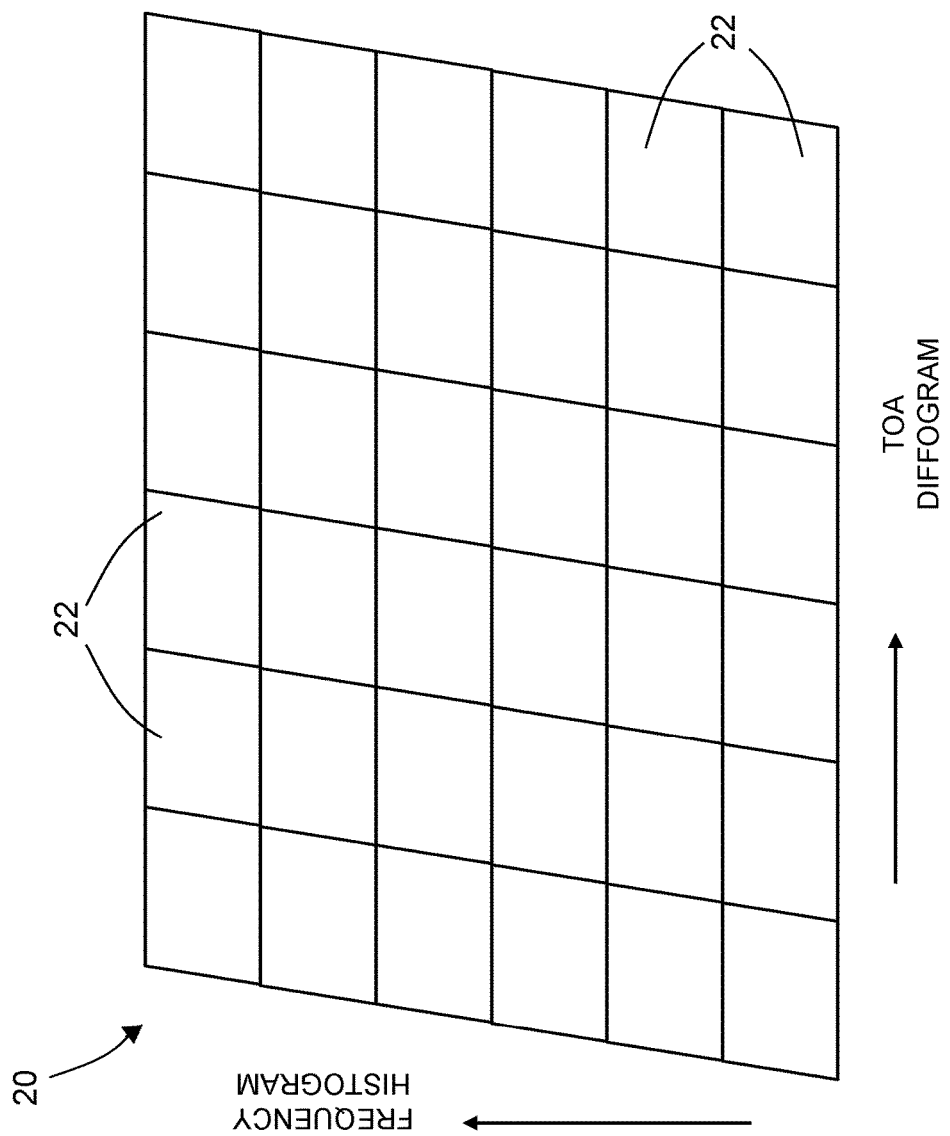
FIG. 5 is a diagram representing the organization of data in a 2-D array of bins containing frequencies, times of arrival and other information, the frequencies being ordered to form a frequency histogram and the times of arrival being ordered to form a respective consecutive stochastic diffogram for each frequency.

FIG. 5 is a diagram representing the organization of data in the 2-D stochastic histogram 20 comprising bins 22 containing frequencies, times of arrival and other information (e.g., bandwidth and energy), the frequencies being arranged in one dimension to form a frequency histogram and the times of arrival being arranged in the other dimension to form a respective consecutive stochastic diffogram for each frequency. The histogram data may be stored in a non-transitory tangible computer-readable storage medium (not shown in the drawings) that is incorporated in the BSS control module 196.

Referring again to FIG. 4, the PDW generation module 128 extracts feature values from the blind source separated signals 129 in a well-known manner to generate PDWs. The PDW generation module 128 will send each PDW as a PDW parameter vector signal 138 similar to (amplitude, time of arrival, center frequency, pulse width and bandwidth)=(amp, toa, cf, pw, bw) to the BSS control module 196. The BSS control module 196 will subtract this information out (step 12 in FIG. 4) from the 2-D stochastic histogram 20. The resulting updated 2-D stochastic histogram 20 represents signal energy (which is a function of amplitude) not captured by the PDW information.

The 2-D stochastic histogram depicted in FIG. 5 has a stochastic frequency histogram in one dimension and a stochastic consecutive stochastic diffogram in the other dimension. For a description of how both a general stochastic histogram and diffogram of any dimension operate, see U.S. Pat. No. 9,046,593, the disclosure of which is incorporated by reference herein in its entirety. The relevant description from that patent can be summarized as follows.

A consecutive stochastic diffogram operates as follows. Let $\{t_i(f, b)\}_{i=1, \ldots, n}$ be the times of arrival of signal energy at a given frequency f and bandwidth b. Since a given frequency and bandwidth corresponds directly to a set of frequency bins $\{B_j\}$ within the frequency range $[f-b/2, f+b/2]$, one can add the energy information at these times spread within each frequency bin as a normal diffogram would operate. Thus one can operate a separate diffogram at each frequency bin and sum signal energy rather than PDW count, which are two differences between what the system disclosed herein is doing and the diffogram described in U.S. Pat. No. 9,046,593. As in the patent, given these times of arrival, the set of differences $\{t_i-t_j\}_{i>j}$ is computed. This set can be constrained by the minimum and maximum pulse repetition interval (PRI), which are determined by typical radar signals, so it typically has much fewer than $$\binom{n}{2} = \frac{n(n-1)}{2}$$

points. [Note: The left side of the above equation means "n choose 2", which is the number of elements in a set where one picks out all possible sets of two elements from a set of size n. This equals n(n−1)/2. So "n choose 2"=3 means there are three ways to choose distinct pairs out of a set of size 3. When discussing all pulse time differences, one is picking all distinct pairs of pulse times.] Just taking a histogram of these difference values is a very poor method because lots of false differences between pulses from different trains would build up. To solve this problem requires a notion of being consecutive. Thus false differences rarely end up being side by side or consecutive, whereas pulse trains with a specific PRI are almost always consecutive. The buildup of n total pulse slots with m missing pulses in the diffogram bin that contains the PRI is at most (n−m−1) and at least (n−2m−1) (worst case with alternating missing pulses).

The details of how energy is added to each frequency/time-of-arrival bin in step 12 is as follows. Let $\delta = t_i - t_j$ be the delta time between two information vectors that fall within a frequency bin $B \in B_j$. Each such bin is defined by its energy value E, its 2-D interval in delta time and frequency, the previous delta time entered and a pointer p to the information vectors contained in this bin, i.e., $$\{E, [t-\Delta t, t+\Delta t][f_B-\Delta f_B, f_B+\Delta f_B], t_{old}, \{p_A\}\}.$$

Then if $\delta \in [t-\Delta t, t+\Delta t]$ and $t_j = t_{old}$, add signal energy e to E and replace $t_{old}$ by $t_j$. Aging would get rid of old bin values using $\{p_k\}$ and the methods from U.S. Pat. No. 9,046,593.

The next stage in the process is to extract events that represent signals from the 2-D stochastic histogram 20 and then update the 2-D stochastic histogram 20 (step 14 in FIG. 4). These events correspond to histogram areas that build up over time. An event detection process monitors the accumulation of the stochastic histogram by an accumulation process to detect an event for the frequency and time of arrival parameters. An event may be, for example, the value for a particular bin in the stochastic histogram being greater than some selected value. In response to the detection of an event, a de-accumulation process extracts the data for the pulses corresponding to the detected event from the stochastic histogram to de-accumulate the stochastic histogram. There are two main ways to do event finding: (1) event finding using mean above mean techniques as disclosed in U.S. Pat. No. 9,046,593; and (2) barcode methods as disclosed in U.S. Pat. No. 9,430,688, the disclosure of which is incorporated by reference herein in its entirety.

In accordance with the first method, after the 2-D stochastic histogram 20 has been constructed, the "lumps" or "peaks" or larger bins must be found. These are called events and event finding is done via the following algorithm. Let $\{h_{ij}\}$ be the set of histogram bin values in two dimensions. We compute its mean above zero $\mu_1 = E(h_{ij} > 0)$ and its mean above mean $u_2 = E(h_{ij} \geq \mu_1)$. All peaks above this value are events. Note that since we are dealing with a diffogram in one dimension, this must be modified slightly. If one were only looking at peaks from a frequency histogram alone, event finding would first find the highest such peak and given the pointer values in the bin, the original data would be extracted and one would de-accumulate the histogram. (As used herein, "de-accumulate" means that after an event has been processed, that event is removed from the histogram.) This process would then be repeated. However, one dimension of the 2-D stochastic histogram 20 is a consecutive stochastic diffogram. A diffogram is different as far as event finding is concerned. When a pulse repetition interval (PRI) difference builds up, so do all the multiples of that PRI. The degree to which they build up is a function of the dropout sequence (where the missing pulses are). In fact, the 1*PRI difference is not necessarily the most prominent event and so the event finder might pick 2*PRI, for example, as the first event. This would effectively make the repetitive signal appear to have the incorrect PRI and it would split a sequence of pulses into multiple different partial collections. To deal with this, one can simply pick the first event in a given PRI for a given frequency instead of the largest and extract all such objects out of the histogram. If one has extracted the correct PRI, then all the PRI multiples will disappear from the histogram. So event finding picks the largest first event over all frequency rows, de-accumulates that event and repeats this process.

Mean above mean techniques have some drawbacks. One drawback is the fact that de-accumulating will only take out a certain portion of the detections, leaving most or many detections still in the histogram. This causes distortion in the next iteration when the next peak is discovered, leading to growing misclassification. Another problem is basic to maximum peak methods, namely that nearby events can be overwhelmed even though they have different characteristics. Barcodes can be used to solve these problems. Barcodes enable many events to be detected simultaneously with better overall performance in classification and fewer misclassifications. An exemplary technique for classifying radar signals will be described in detail later with reference to FIGS. 6-10.

Referring again to FIG. 4, new frequency/bandwidth initializations of BSS channels are generated (step 16) after event finding. The previous event finding step 14 produces frequencies and bandwidths where recurring energy is present that is not accounted for by the PDW output 138. These frequencies and bandwidths can be passed to any unused BSS channel filter to search and track signal energy. Because recurring energy builds up over time, signals with low SNR can be processed and PDWs would be produced that could not be found with an existing denoising/BSS subsystem since it uses instantaneous detection thresholds for decision making and does not have available signal information over longer periods of time.

In addition to passing the event information to unused BSS channels, frequencies that are high in priority due to missing information can also be passed to other unused BSS channels. This works as follows: (1) each bin in both frequency and time has a given priority that is used in the absence of signal information; (2) each priority value from each unoccupied bin in each frequency row is summed across the row; and (3) the frequency is chosen from the row with the maximum sum of priority values. This frequency together with an appropriate starting bandwidth are used to initialize an unused BSS channel filter. Thus missing information is filled in using frequency priority order (that comes ultimately from the system and scenario requirements).

The techniques disclosed herein drive any unused BSS filter hardware to fill in the unknown information along with the known information. These methods: (1) provide the capability to classify groups of arbitrary signals under user-chosen parameter sets under overlapping classification conditions; (2) allow trade-offs in sensitivity to histogram shape; (3) avoid problems with lengthy iterations of de-accumulating histograms by simultaneously classifying large numbers of signals at each iteration; and (4) fill in sparse areas of the histograms and allow tracking using barcodes or other event finding methods. These provide many benefits directly to applications such as radar, electronic warfare and communications.

As previously mentioned above, the signal classifying technology in accordance with one embodiment uses the topology technique which is disclosed in U.S. Pat. No. 9,430,688, which is useful for multi-dimensional shapes under continuous transformation. When utilizing this histogram-based overlapping classifier, the input includes binned points (vectors) in N-dimensional space. This technology creates an N-dimensional surface with peaks at various points which can be characterized in order to determine what types of signals are present. When utilizing the topology techniques with real data, the technology also addresses problems of noise and sampling. By way of illustration, when sampling points from X with noise $(X_k+n_k)$, generally the shape information of X cannot be inferred from $\{X_k+n_k\}$ because interpolating to fill in the sampling and data gaps using a fixed threshold can create problems. The technology disclosed herein captures shape information for various possible threshold values concurrently. The technology utilizes a topological data analysis to operate on a function where the collection of the individual regions of the topological data analysis function represents a shape class persisting for its regions. In one dimension, these regions are intervals or segments and will be referred to as such in the remainder of this disclosure. However, this technique also applies more generally to N dimensions. The collection of segments can be generally referred to as a "barcode" due to its general resemblance to a barcode. Long intervals can correspond to large scale geometric features like wide peaks that provide signal classification while short intervals can correspond to noise or inadequate sampling.

Figure 6:
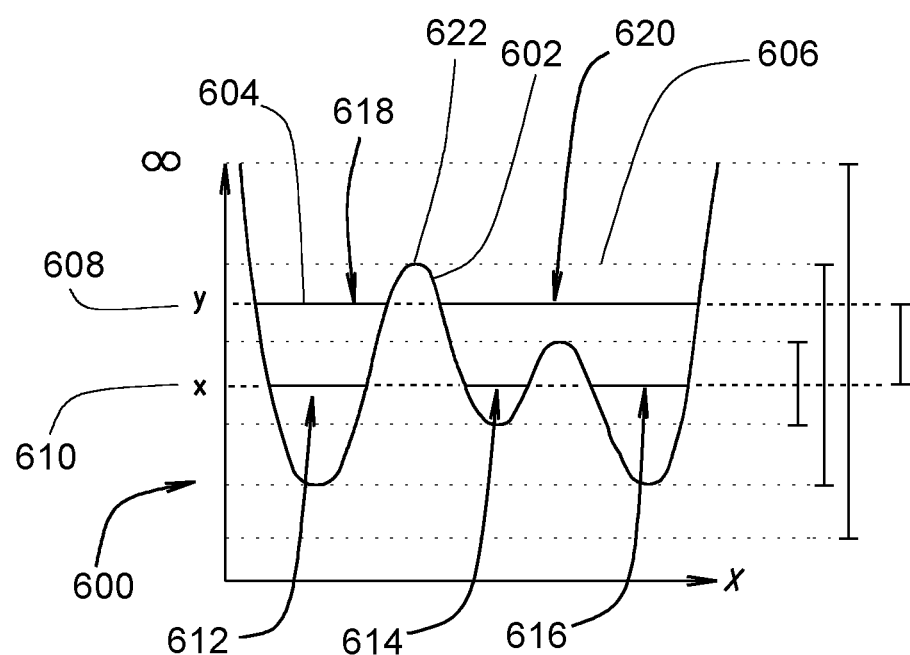
FIG. 6 is a diagram representing a barcode and barcode tracking using levels to create barcodes.

FIG. 6 is a diagram illustrating a one-dimensional version of a flat line signal (barcode) operating on a function of one variable. Each bar represents how long a particular feature, namely the number of distinct segments above the function, are present. More specifically, FIG. 6 shows a graphical illustration 600 of a one-dimensional barcode 604 operating on a smoothed histogram 602 representative of accumulated data from a signal. One or more parameters are accumulated and represented in a bin of the histogram. The signal is captured or sensed and parameters from the signal are measured and put into the histogram. The parameters accumulate over time. Histogram levels 606 are illustrated by dashed lines. The barcode will descend from a higher level and initially engage the smoothed histogram 602 at its highest peak 622, at which point the barcode scan line is divided into two intervals (barcode tracks) 618 and 620 as illustrated at level "y" 608. As the barcode scan line continues to descend to level "x" 610, then the barcode is segmented into three intervals 612, 614 and 616 when the barcode scan line descends to engage the second peak. The three intervals 612, 614 and 616 are illustrated at the lower level "x". For example, the smallest bar 614 represents the interval during which three separate segments are above the function while the longest bar 620 represents the interval during which at least one segment is above the function. This illustrates the concept of persistence in this one-dimensional example.

Figure 7:
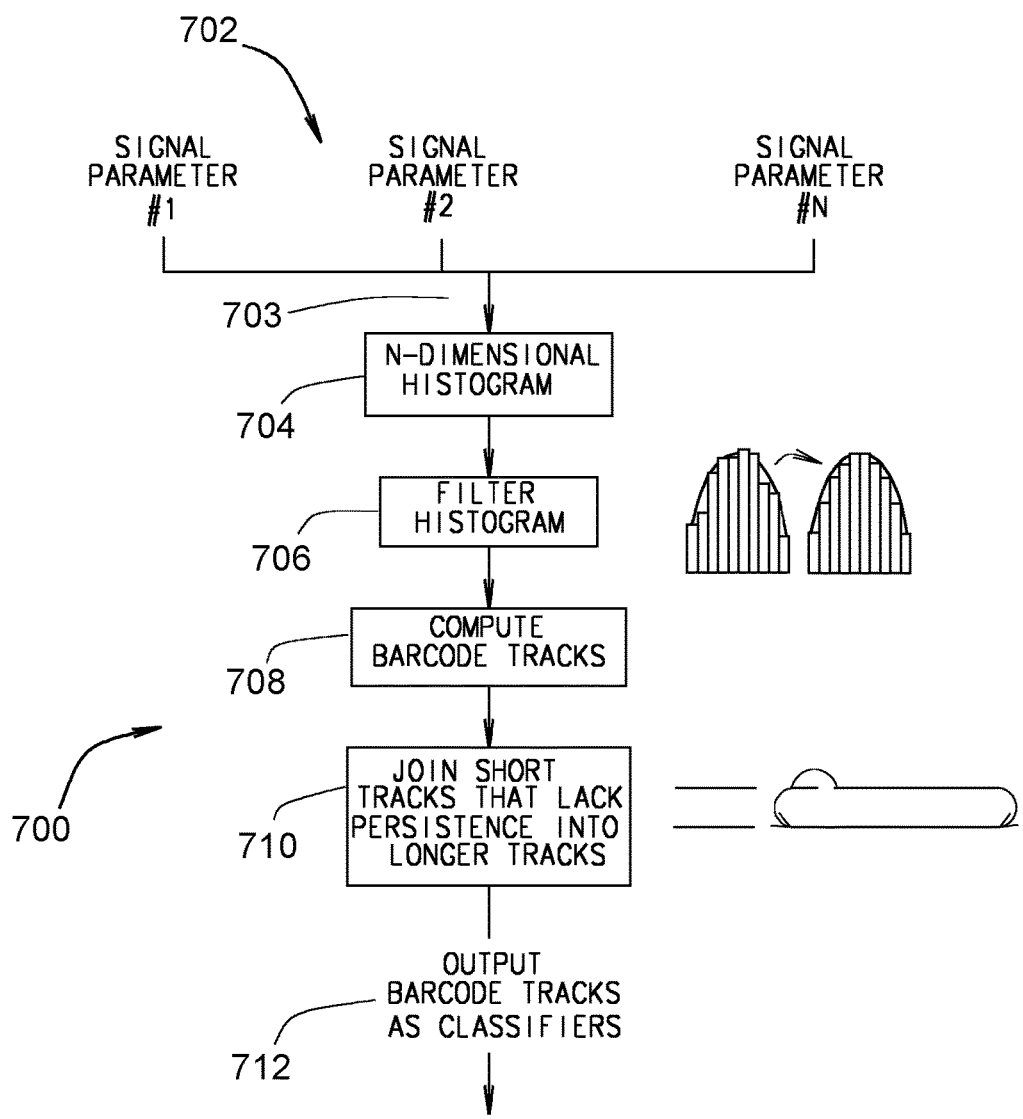
FIG. 7 is a flowchart identifying steps of a topological histogram-based signal classification process using tracked barcodes applied to N-dimensional histograms, with side illustrations for the one-dimensional case.
Figure 8:
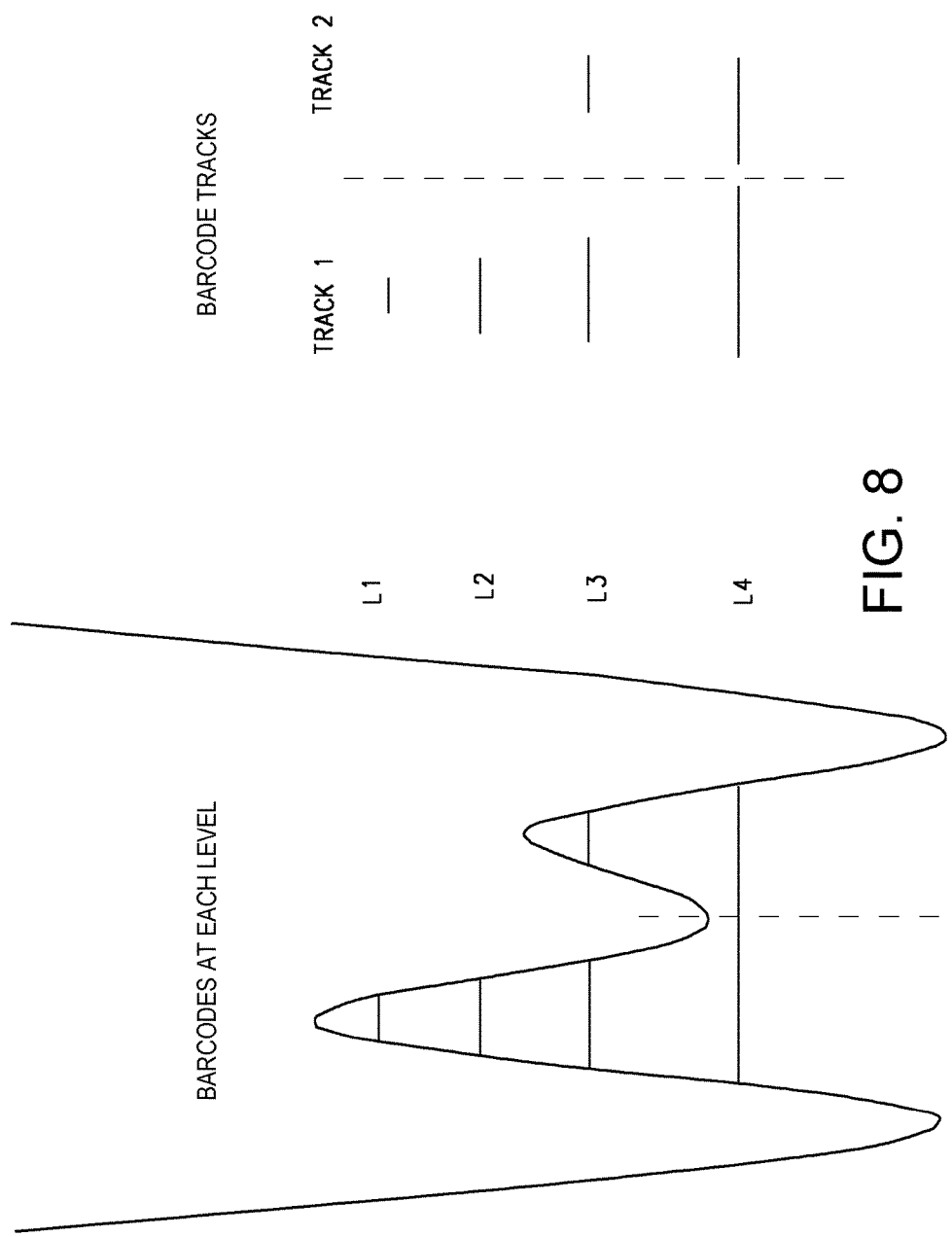
FIG. 8 is a diagram representing barcode levels and corresponding barcode tracks.

FIG. 7 is a flowchart identifying steps of a topological histogram-based signal classification process 700 for classifying overlapping multi-signals using tracked barcodes applied to N-dimensional histograms, with side illustrations for the one-dimensional case. A plurality of N signal parameters 702 provided from a signal sensing device are received (step 703). The method includes the process of generating an N-dimensional histogram (step 704) using an N-dimensional histogram generator, which can be implemented in software executing on a custom programmed computer or by hardware, such an N-dimensional histogram generation circuit. The histogram generator produces an N-dimensional histogram from accumulated N-dimensional signal parameter data. The histogram of accumulated parameters is then filtered (step 706) to smooth the histogram. The process further comprises computing barcode tracks (step 708) and joining short tracks that lack persistence with the longer tracks (step 710). The signal classification process 700 outputs barcode tracks as classifiers 712. FIG. 8 is a diagram representing barcodes at multiple levels L1 through L4 and corresponding barcode tracks.

A more detailed description of the steps identified in FIG. 7 will now be provided. More specifically, the barcode-based signal classification method in accordance with one embodiment comprises the step 704 of forming an N-dimensional histogram from N-dimensional signal parameter data. By way of illustration, a 2-D frequency-time histogram of a radar signal can be formed.

The method shown in FIG. 7 further comprises the step 706 of filtering the original histogram bins by treating the histogram bin heights as an N-dimensional signal and filtering their heights using a smoothing filter, thereby creating a smoother shaped curve outline to reduce barcode (the persistent topology of data) fracturing. The smoothing filter is an approximation function or more generally a transformation function that is utilized to smooth a data set. The smoothing filter is an approximating function that captures important patterns in the data, while leaving out noise or other fine-scale structures/rapid phenomena. In smoothing, the data points of an original histogram are modified so that individual points are reduced, and points that are lower than the adjacent points are increased, which leads to a smoother signal. Smoothing can aid in data analysis by allowing for more information to be extracted from the data and can provide for analysis that is more flexible. Various smoothing filters can be utilized that are well known in the art.

The method shown in FIG. 7 further comprises the step 708 of computing barcode tracks. Barcode tracks are the collection of "intervals" or segments by way of a persistent topology analysis that are tracked down from higher barcode levels until they disappear, where there are no further tracks (segmenting). This produces a single barcode having a set of disjointed intervals that represent the possible locations of classes, one for each region bounded by the barcode intervals (areas in two dimensions, volumes in three dimensions, etc.). These are the collection of N-dimensional intervals or regions (typically one would use simple shapes called n-parallelotopes that generalize intervals in one dimension) that are tracked down from higher barcode levels until they disappear. This produces a single barcode track having a set of disjointed n-parallelotope regions that represent the possible locations of classes, one for each region. Thus, various classes can be identified and predicted to be bounded by the union of the disjointed barcode track regions; this would be a union of areas in two dimensions, a union of volumes in three dimensions, etc. This process is shown pictorially in one dimension in FIG. 6.

Figure 10:
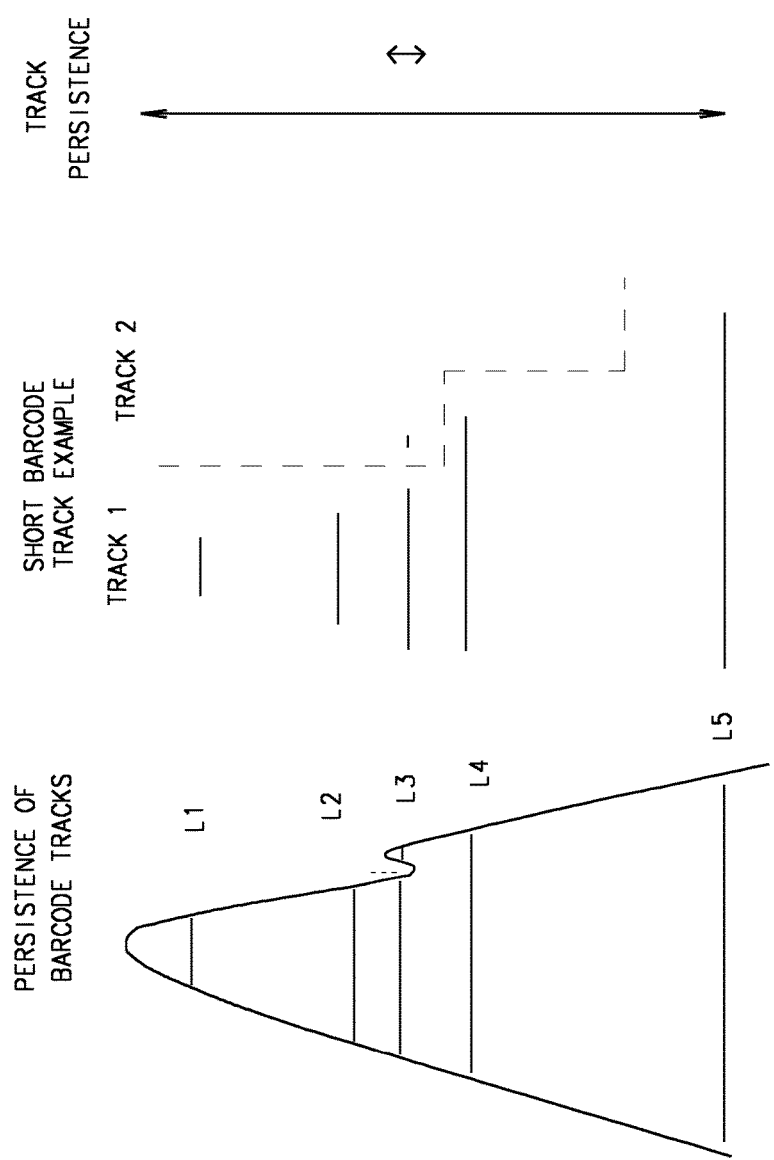
FIG. 10 is a diagram representing short tracks that lack persistence.

The method shown in FIG. 7 further comprises the step 710 of joining short barcode track intervals that lack persistence to longer barcode intervals. FIG. 10 is a diagrammatic representation of short tracks that lack persistence. Short or small barcode track intervals (i.e., those whose vectorized length is below a certain minimum vector value $\Delta_{min}$(SNR) chosen as a function of the signal-to-noise ratio as applied to each of the signal parameters in each dimension) that persist for a small time interval (less than a certain time interval $\Delta_t$(SNR) chosen as a function of the SNR as wall) are joined to a larger barcode track region that is nearest to the interval under consideration. The joining process in one dimension simply takes the smallest interval that encompasses both the short interval and the longer barcode interval next to it. This is shown pictorially in FIG. 7 (to the right of block 710). In general for N dimensions, a new larger n-parallelotope would be created which encompasses both the smaller barcode track region and the larger barcode track region nearest to it by extending the sides of the new n-parallelotope, just as in the one-dimensional case where a new interval is created that covers both the small and larger intervals.

Figure 9:
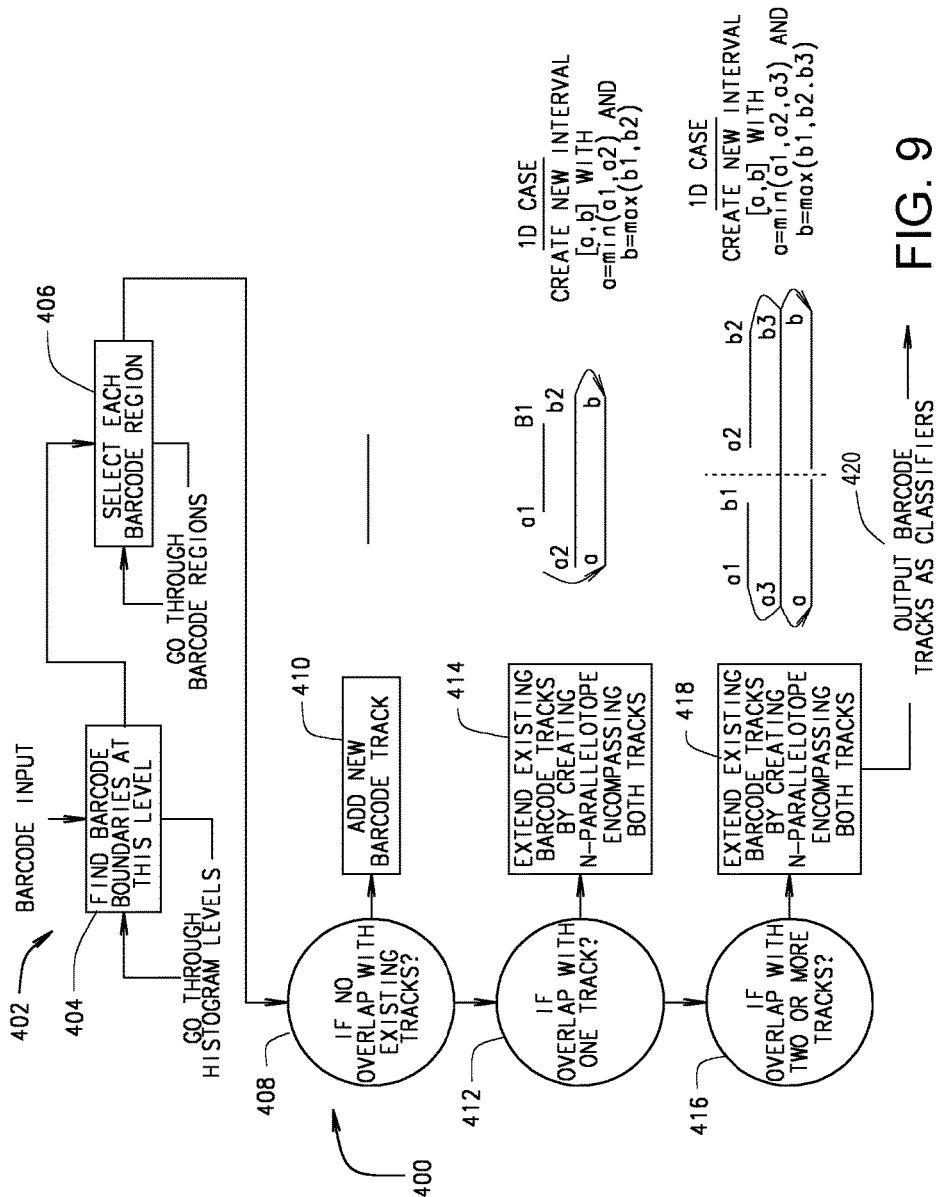
FIG. 9 is a flowchart identifying steps of a barcode tracking and joining process used in topological histogram-based signal classification.

Steps of a method 400 of computing barcode track classifiers are identified in FIG. 9. A collection of barcode tracks can be received (step 402). After the basic barcode is computed for the N-dimensional histogram, the barcode track process can include selecting a barcode level and finding the barcode endpoints (or boundaries) for this level (step 404) and repeating so as to go through all the histogram levels. The method can further include selecting a barcode interval or region (step 406) within each level and going through all levels. If a determination is made that there is no overlap with existing barcode track intervals (step 408), then a new barcode track interval is created (step 410). If a determination is made that there is overlap with one existing barcode track interval (step 412), then the track is extended on one end to include the new interval (step 414). If a determination is made that there is overlap with two or more existing barcode track intervals (step 416), then a new track is created whose ends encompass all the intersected tracks as well as the interval under consideration (step 418). After joining the short tracks to the longer tracks, the barcode track classifiers can be output (step 420).

The technology disclosed hereinabove can operates within an electronic receiver system to blindly separate low-SNR signals using existing blind source separation methods which typically require higher detection-level SNRs (about 12-16 dB) within their matched bandwidth. The disclosed methods have multiple features. The disclosed methods reduce the SNR requirement through a novel stochastic 2-D data array comprising a frequency histogram with respective consecutive stochastic diffograms for each frequency. More specifically, this 2-D data array comprises a respective set of frequency bins for each signal frequency, the frequency bins in each set containing energy information for respective times of arrival to form the respective diffogram. The disclosed methods for gathering wideband signal power spectral information do not use special Fourier transform hardware and software. The disclosed methods do not use extremely large signal memories. The disclosed methods use standard real-time BSS information. The disclosed methods use real-time information from a BSS subsystem together with long-term information from a 2-D stochastic histogram to enhance signal detection and separation in a BSS subsystem. The disclosed methods fill in information from sparse regions of interest in time and frequency with a 2-D stochastic histogram by driving any unused BSS filter hardware to fill in the unknown information.

To summarize the general concept, the method for performing blind source separation of signals disclosed herein comprises: (a) separating signals as a function of frequency using at least some of a plurality of filters; (b) generating a first multiplicity of data sets of parameter values of all separated signals, wherein each data set of parameter values of the first multiplicity comprises time of arrival, frequency and energy; (c) adding the first multiplicity of data sets of parameter values of the information vectors to a two-dimensional stochastic histogram; (d) generating a second multiplicity of data sets of parameter values of all separated signals having energy greater than a detection threshold, wherein each data set of parameter values of the second multiplicity comprises time of arrival, frequency and energy; (e) subtracting from the two-dimensional stochastic histogram those data sets of parameter values of the first multiplicity which are equivalent to the data sets of parameter values of the second multiplicity; (f) identifying data sets of parameter values stored in the two-dimensional stochastic histogram corresponding to separated signals having energy less than the detection threshold; and (g) tuning an unused one of the plurality of filters to pass signals having a frequency characteristic of separated signals having energy less than the detection threshold. In the disclosed embodiments, the data sets of parameter values of the second multiplicity are pulse descriptor words.

Certain systems, apparatus, applications or processes are described herein as including a number of modules. A module may be a unit of distinct functionality that may be implemented in software, hardware, or combinations thereof. By way of illustration, the histogram generator having a data input adapted to receive one or more of a signal and/or a variable and configured to form an original N-dimensional histogram function from one or more of N-dimensional signal parameter data for the signal for extracting characteristic parameters of the signal can be implemented in software, hardware, or combinations thereof. When the functionality of a module is performed in any part through software, the module can include a non-transitory tangible computer-readable storage medium. The modules may be regarded as being communicatively coupled.

While blind source separation systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more processing or computing devices. Such devices typically include a processor, processing device, or controller, such as a general-purpose central processing unit, a microcontroller, a reduced instruction set computer (RISC) processor, an ASIC, a programmable logic circuit, an FPGA, a digital signal processor, and/or any other circuit or processing device capable of executing the functions described herein. The methods described herein may be encoded as executable instructions embodied in a non-transitory tangible computer-readable storage medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms "processor" and "computing device".

The invention claimed is:

1. A method for performing blind source separation of signals, comprising:
    separating signals as a function of frequency using at least some of a plurality of filters;
    generating information vectors comprising respective data sets of parameter values of all separated signals regardless of their energy, wherein each data set of parameter values making up an information vector comprises time of arrival, frequency and energy;
    adding the data sets of parameter values of the information vectors to a two-dimensional stochastic histogram with frequency along one axis and a consecutive stochastic diffogram along the other axis;
    identifying data sets of parameter values stored in the two-dimensional stochastic histogram corresponding to separated signals having energy less than a detection threshold; and
    tuning an unused one of the plurality of filters to pass signals having a frequency characteristic of separated signals having energy less than the detection threshold.

2. The method as recited in claim 1, further comprising:
    generating pulse descriptor words comprising respective data sets of parameter values of separated signals having energy greater than the detection threshold, wherein each data set of parameter values making up a pulse descriptor word comprises amplitude, time of arrival and frequency; and
    subtracting from the two-dimensional stochastic histogram those data sets of parameter values which are equivalent to the data sets of parameter values of the pulse descriptor words.

3. The method as recited in claim 2, further comprising generating pulse descriptor words comprising respective data sets of parameter values of signals passed through the tuned filter of the plurality of filters.

4. The method as recited in claim 3, further comprising identifying a source of the signals passed through the tuned filter based on pulse descriptor words comprising the respective data sets of parameter values of the signals passed through the tuned filter.

5. The method as recited in claim 2, wherein the identifying step comprises finding events in the two-dimensional stochastic histogram.

6. The method as recited in claim 5, wherein the event finding uses a mean above mean technique.

7. The method as recited in claim 5, wherein the event finding comprises tracking barcodes that cover sparse regions of interest.

8. The method as recited in claim 1, wherein the two-dimensional stochastic histogram is a data array comprising a respective set of frequency bins for each frequency of a plurality of frequencies, the frequency bins in each set of frequency bins containing energy information for signals having respective times of arrival to form a respective consecutive stochastic diffogram.

9. The method as recited in claim 8, wherein each frequency bin has a respective priority value, the method further comprising:
    for each set of frequency bins, summing the priority values from each unoccupied frequency bin in that set of frequency bins; and
    tuning an unused one of the plurality of filters to pass signals having a frequency equal to the frequency of the set of frequency bins having a sum of priority values which is a maximum.

10. A system for processing received signals, comprising:
a plurality of blind source separation channels, each blind source separation module comprising a respective filter and a respective blind source separation channel state machine associated with the respective filter; and
a blind source separation control module communicatively coupled to the blind source separation channel state machines of the plurality of blind source separation channels,
wherein at least some of the plurality of blind source separation channels are configured to separate signals as a function of frequency and the blind source separation channel state machines are configured to generate information vectors comprising respective data sets of parameter values of all separated signals regardless of their energy, wherein each data set of parameter values making up an information vector comprises time of arrival, frequency and energy, and
wherein the blind source separation control module is configured to add the data sets of parameter values of the information vectors to a two-dimensional stochastic histogram with frequency along one axis and a consecutive stochastic diffogram along the other axis, identify data sets of parameter values stored in the two-dimensional stochastic histogram corresponding to separated signals having energy less than a detection threshold, and tune an unused one of the plurality of filters to pass signals having a frequency characteristic of separated signals having energy less than the detection threshold.

11. The system as recited in claim 10, further comprising a pulse descriptor word generation module communicatively coupled to the plurality of blind source separation channels, wherein:
the pulse descriptor word generation module is configured to generate pulse descriptor words comprising respective data sets of parameter values of separated signals having energy greater than the detection threshold, wherein each data set of parameter values making up a pulse descriptor word comprises amplitude, time of arrival and frequency; and
the blind source separation control module is further configured to subtract from the two-dimensional stochastic histogram those data sets of parameter values which are equivalent to the data sets of parameter values of the pulse descriptor words.

12. The system as recited in claim 11, wherein the pulse descriptor word generation module is further configured to generate pulse descriptor words comprising respective data sets of parameter values of signals passed through the tuned filter of the plurality of filters.

13. The system as recited in claim 12, further comprising a processor communicatively coupled to the pulse descriptor word generation module and configured to identify a source of the signals passed through the tuned filter based on pulse descriptor words comprising the respective data sets of parameter values of the signals passed through the tuned filter.

14. The system as recited in claim 11, wherein the identifying operation performed by the blind source separation control module comprises finding events in the two-dimensional stochastic histogram.

15. The system as recited in claim 14, wherein the event finding uses a mean above mean technique.

16. The system as recited in claim 14, wherein the event finding comprises tracking barcodes that cover sparse regions of interest.

17. The system as recited in claim 10, wherein the two-dimensional stochastic histogram is a data array comprising a respective set of frequency bins for each frequency of a plurality of frequencies, the frequency bins in each set of frequency bins containing energy information for signals having respective times of arrival to form a respective consecutive stochastic diffogram.

18. The system as recited in claim 17, wherein each frequency bin has a respective priority value, the blind source separation control module being further configured to:
for each set of frequency bins, sum the priority values from each unoccupied frequency bin in that set of frequency bins; and
tune an unused one of the plurality of filters to pass signals having a frequency equal to the frequency of the set of frequency bins having a sum of priority values which is a maximum.

19. A method for performing blind source separation of signals, comprising:
separating signals as a function of frequency using at least some of a plurality of filters;
generating a first multiplicity of data sets of parameter values of all separated signals, wherein each data set of parameter values of the first multiplicity comprises time of arrival, frequency and energy;
adding the first multiplicity of data sets of parameter values of the information vectors to a two-dimensional stochastic histogram with frequency along one axis and a consecutive stochastic diffogram along the other axis;
generating a second multiplicity of data sets of parameter values of all separated signals having energy greater than a detection threshold, wherein each data set of parameter values of the second multiplicity comprises time of arrival, frequency and energy;
subtracting from the two-dimensional stochastic histogram those data sets of parameter values of the first multiplicity which are equivalent to the data sets of parameter values of the second multiplicity;
identifying data sets of parameter values stored in the two-dimensional stochastic histogram corresponding to separated signals having energy less than the detection threshold; and
tuning an unused one of the plurality of filters to pass signals having a frequency characteristic of separated signals having energy less than the detection threshold.

20. The method as recited in claim 19, wherein the data sets of parameter values of the second multiplicity are pulse descriptor words.

* * * * *